(12) United States Patent
Fitzgerald et al.

(10) Patent No.: US 12,355,984 B2
(45) Date of Patent: Jul. 8, 2025

(54) CONTENT COMPRESSION FOR NETWORK TRANSMISSION

(71) Applicant: Immersive Robotics Pty Ltd, Fortitude Valley (AU)

(72) Inventors: Daniel Liam Fitzgerald, Fortitude Valley (AU); Rodney Ian Lamb, Fortitude Valley (AU)

(73) Assignee: Immersive Robotics Pty Ltd, Fortitude Valley (AU)

( * ) Notice: Subject to any disclaimer, the term of this patent is extended or adjusted under 35 U.S.C. 154(b) by 0 days.

(21) Appl. No.: 18/031,590

(22) PCT Filed: Oct. 16, 2020

(86) PCT No.: PCT/AU2020/051113
§ 371 (c)(1),
(2) Date: Apr. 12, 2023

(87) PCT Pub. No.: WO2021/072498
PCT Pub. Date: Apr. 22, 2021

(65) Prior Publication Data
US 2024/0121406 A1   Apr. 11, 2024

(51) Int. Cl.
*H04N 7/12* (2006.01)
*H04N 19/115* (2014.01)
(Continued)

(52) U.S. Cl.
CPC ......... *H04N 19/164* (2014.11); *H04N 19/115* (2014.11); *H04N 19/146* (2014.11); *H04N 21/64738* (2013.01); *H04N 21/64784* (2013.01)

(58) Field of Classification Search
CPC .. H04N 19/164; H04N 19/115; H04N 19/146; H04N 21/64738; H04N 19/162;
(Continued)

(56) References Cited

U.S. PATENT DOCUMENTS

| 4,504,263 A | 3/1985 | Steuer et al. |
| 5,325,125 A | 6/1994 | Naimpally |

(Continued)

FOREIGN PATENT DOCUMENTS

| CA | 2798300 | 6/2014 |
| CN | 1675929 | 9/2005 |

(Continued)

OTHER PUBLICATIONS

Anderson, et al. "Piecewise Fourier Transformation for Picture Bandwidth Compression," IEEE Transactions on Communication Technology. vol. COM-19, No. 2, Apr. 1971. 8 pages.

(Continued)

*Primary Examiner* — Gims S Philippe
(74) *Attorney, Agent, or Firm* — Fish IP Law, LLP; Tomas A. Prieto

(57) ABSTRACT

A system for controlling content compression for transmission via a communications network used to serve content to a plurality of users, the system including one or more processing devices configured to acquire one or more network metrics indicative of communications network performance, acquire one or more user metrics for each of the plurality of users, the one or more user metrics being indicative of content display requirements associated with each user, dynamically calculate a target compression for each of the plurality of users at least in part based on at least one of the network metrics and the user metrics and cause content for each user to be compressed in accordance with the target compression for that user.

20 Claims, 21 Drawing Sheets

(51) Int. Cl.
*H04N 19/146* (2014.01)
*H04N 19/164* (2014.01)
*H04N 21/647* (2011.01)

(58) Field of Classification Search
CPC ......... H04N 21/6379; H04N 21/64784; H04N 19/167; H04L 65/61; H04L 65/70; H04L 65/762; H04L 65/752; H04L 65/756; H04L 69/04; H04L 65/80; H04L 65/613; G02B 27/0093; G02B 2027/0147; G02B 27/017; G02B 27/01
See application file for complete search history.

(56) References Cited

U.S. PATENT DOCUMENTS

| | | | |
|---|---|---|---|
| 5,559,557 | A | 9/1996 | Kato |
| 5,703,793 | A | 12/1997 | Wise et al. |
| 5,909,250 | A | 6/1999 | Hardiman |
| 5,963,673 | A | 10/1999 | Kodama |
| 6,078,349 | A | 6/2000 | Molloy |
| 6,091,777 | A | 7/2000 | Guetz |
| 6,101,284 | A | 8/2000 | Matsubara |
| 6,233,590 | B1 | 5/2001 | Shaw |
| 6,249,614 | B1 | 6/2001 | Kolesnik et al. |
| 6,252,989 | B1 | 6/2001 | Geisler |
| 6,259,991 | B1 | 7/2001 | Nysen |
| 6,310,962 | B1 | 10/2001 | Chung |
| 6,353,685 | B1 | 3/2002 | Wu |
| 7,027,655 | B2 | 4/2006 | Keeney |
| 7,583,982 | B2 | 9/2009 | Olsen et al. |
| 7,689,047 | B2 | 3/2010 | Bahar |
| 7,692,642 | B2 | 4/2010 | Wyatt |
| 7,734,105 | B2 | 6/2010 | Strom |
| 7,904,117 | B2 | 3/2011 | Doan |
| 8,098,941 | B2 | 1/2012 | Moussavi |
| 8,184,069 | B1 | 5/2012 | Rhodes |
| 8,366,552 | B2 | 2/2013 | Perlman |
| 8,369,324 | B1 | 2/2013 | Breight et al. |
| 8,374,242 | B1 | 2/2013 | Lewis |
| 8,416,847 | B2 | 4/2013 | Roman |
| 8,457,026 | B1 | 6/2013 | Ho |
| 8,787,454 | B1 | 7/2014 | Chechik |
| 8,965,140 | B1 | 2/2015 | Xu et al. |
| 9,281,559 | B2 | 3/2016 | Ransom et al. |
| 9,367,499 | B2 | 6/2016 | Yun |
| 9,596,053 | B1 | 3/2017 | Marupaduga et al. |
| 9,648,346 | B2 | 5/2017 | Zhang |
| 9,665,332 | B2 | 5/2017 | Otsuka |
| 9,811,874 | B2 | 11/2017 | Narayan |
| 10,155,160 | B2 | 12/2018 | Van Der Laan |
| 10,224,758 | B2 | 3/2019 | Leabman |
| 10,237,577 | B2 | 3/2019 | Jeong et al. |
| 10,243,414 | B1 | 3/2019 | Leabman |
| 10,523,914 | B1 | 12/2019 | Philips et al. |
| 10,657,674 | B2 | 5/2020 | Fitzgerald |
| 11,153,604 | B2 | 10/2021 | Fitzgerald |
| 2001/0007575 | A1 | 7/2001 | Mori |
| 2002/0090140 | A1 | 7/2002 | Thirsk |
| 2002/0154693 | A1 | 10/2002 | Demos |
| 2003/0138150 | A1 | 7/2003 | Srinivasan |
| 2005/0018911 | A1 | 1/2005 | Deever |
| 2005/0152450 | A1 | 7/2005 | Ueno |
| 2006/0195464 | A1 | 8/2006 | Guo |
| 2007/0037528 | A1 | 2/2007 | Doan |
| 2007/0263938 | A1 | 11/2007 | Lee |
| 2008/0055318 | A1 | 3/2008 | Glen |
| 2008/0211901 | A1 | 9/2008 | Civanlar |
| 2008/0266410 | A1 | 10/2008 | Fukuhara et al. |
| 2009/0016631 | A1 | 1/2009 | Naito |
| 2009/0033588 | A1 | 2/2009 | Kajita |
| 2010/0093282 | A1 | 4/2010 | Martikkala |
| 2010/0124279 | A1 | 5/2010 | Reddy |
| 2011/0038556 | A1 | 2/2011 | Mathe |
| 2011/0235706 | A1 | 9/2011 | Demircin |
| 2012/0121012 | A1 | 5/2012 | Shiodera |
| 2012/0206452 | A1 | 8/2012 | Geisner |
| 2012/0275718 | A1 | 11/2012 | Takamori |
| 2012/0314026 | A1 | 12/2012 | Chen |
| 2013/0040682 | A1 | 2/2013 | Chang |
| 2013/0215961 | A1 | 8/2013 | Nakagawa et al. |
| 2013/0343450 | A1* | 12/2013 | Solka .................... H04N 19/46 375/240.03 |
| 2014/0022125 | A1 | 1/2014 | Zhu |
| 2014/0092150 | A1 | 4/2014 | Slavenburg et al. |
| 2014/0118398 | A1 | 5/2014 | Hall |
| 2014/0128032 | A1 | 5/2014 | Muthukumar |
| 2014/0184475 | A1 | 7/2014 | Tantos |
| 2014/0218236 | A1 | 8/2014 | Sadeghi |
| 2014/0241428 | A1 | 8/2014 | Sato |
| 2014/0348438 | A1 | 11/2014 | Yang |
| 2014/0357993 | A1 | 12/2014 | Hiriyannaiah |
| 2015/0031296 | A1 | 1/2015 | Holman |
| 2015/0071359 | A1 | 3/2015 | Guo |
| 2015/0103183 | A1 | 4/2015 | Abbott |
| 2015/0172545 | A1 | 6/2015 | Szabo |
| 2015/0237351 | A1 | 8/2015 | Lee |
| 2015/0279103 | A1 | 10/2015 | Naegle |
| 2016/0119646 | A1 | 4/2016 | Eslami |
| 2016/0127490 | A1 | 5/2016 | Li |
| 2016/0227257 | A1 | 8/2016 | Frishman et al. |
| 2016/0248995 | A1 | 8/2016 | Mullins |
| 2016/0259032 | A1 | 9/2016 | Hehn et al. |
| 2016/0267884 | A1 | 9/2016 | Binstock |
| 2016/0357367 | A1 | 12/2016 | Foster |
| 2016/0360209 | A1 | 12/2016 | Gosling |
| 2016/0380692 | A1 | 12/2016 | Jalali |
| 2016/0381398 | A1 | 12/2016 | Saxena |
| 2017/0006290 | A1 | 1/2017 | Osawa |
| 2017/0051171 | A1 | 2/2017 | Adamic et al. |
| 2017/0053450 | A1 | 2/2017 | Rodriguez et al. |
| 2017/0060678 | A1 | 3/2017 | Jeganathan et al. |
| 2017/0069227 | A1 | 3/2017 | Dialameh |
| 2017/0072483 | A1 | 3/2017 | Gamble |
| 2017/0072484 | A1 | 3/2017 | Baratta |
| 2017/0075416 | A1 | 3/2017 | Armstrong |
| 2017/0085462 | A1 | 3/2017 | Zhou et al. |
| 2017/0085872 | A1 | 3/2017 | Perron |
| 2017/0098231 | A1 | 4/2017 | Dietrich |
| 2017/0103571 | A1 | 4/2017 | Beaurepaire |
| 2017/0142444 | A1 | 5/2017 | Henry |
| 2017/0150147 | A1 | 5/2017 | Forsyth |
| 2017/0191429 | A1 | 7/2017 | Tylutki et al. |
| 2017/0194706 | A1 | 7/2017 | Lee et al. |
| 2017/0207971 | A1 | 7/2017 | Kripalani et al. |
| 2017/0221182 | A1 | 8/2017 | Cawley |
| 2017/0236252 | A1 | 8/2017 | Nguyen |
| 2017/0280145 | A1 | 9/2017 | Kubota |
| 2017/0285735 | A1 | 10/2017 | Young |
| 2017/0286735 | A1 | 10/2017 | Young |
| 2017/0324951 | A1 | 11/2017 | Raveendran |
| 2017/0352322 | A1 | 12/2017 | Spence |
| 2018/0046892 | A1 | 2/2018 | Hyde et al. |
| 2018/0054241 | A1 | 2/2018 | Pi |
| 2018/0055332 | A1 | 3/2018 | Lee et al. |
| 2018/0082904 | A1 | 3/2018 | Basker et al. |
| 2018/0089091 | A1 | 3/2018 | Akenine-Moller |
| 2018/0093177 | A1 | 4/2018 | Tokubo |
| 2018/0095529 | A1 | 4/2018 | Tokubo |
| 2018/0114082 | A1 | 4/2018 | Choi |
| 2018/0132192 | A1 | 5/2018 | Yang et al. |
| 2018/0146198 | A1 | 5/2018 | Atluru |
| 2018/0211287 | A1 | 7/2018 | Bryon et al. |
| 2018/0224841 | A1 | 8/2018 | Tani et al. |
| 2018/0224842 | A1 | 8/2018 | Ichimura |
| 2018/0229458 | A1 | 8/2018 | Thallner et al. |
| 2018/0229462 | A1 | 8/2018 | Shimada et al. |
| 2018/0268571 | A1 | 9/2018 | Park et al. |
| 2018/0324438 | A1 | 11/2018 | Kwak |
| 2018/0357809 | A1 | 12/2018 | Lawless |
| 2019/0019315 | A1 | 1/2019 | Bastani |
| 2019/0025760 | A1 | 1/2019 | Ashrafi et al. |
| 2019/0033058 | A1 | 1/2019 | Tsurumi |
| 2019/0089984 | A1 | 3/2019 | He |

(56) References Cited

U.S. PATENT DOCUMENTS

| | | | |
|---|---|---|---|
| 2019/0110053 A1 | 4/2019 | Varia et al. | |
| 2019/0122436 A1 | 4/2019 | Bashkirov | |
| 2019/0141324 A1 | 5/2019 | Bjorklund | |
| 2019/0378305 A1 | 12/2019 | Fitzgerald et al. | |
| 2019/0379428 A1 | 12/2019 | Lucas | |
| 2020/0042263 A1 | 2/2020 | Iyer et al. | |
| 2020/0053393 A1 | 2/2020 | Niamut et al. | |
| 2020/0081524 A1 | 3/2020 | Schmidt | |
| 2020/0099733 A1* | 3/2020 | Chu | H04N 21/8456 |
| 2020/0128274 A1 | 4/2020 | Rosewarne | |
| 2021/0194991 A1* | 6/2021 | Rickeby | H04N 21/2343 |

FOREIGN PATENT DOCUMENTS

| | | |
|---|---|---|
| CN | 103096075 | 5/2013 |
| CN | 103188491 | 7/2013 |
| CN | 106688229 | 5/2017 |
| EP | 1720356 | 5/2005 |
| EP | 1892965 | 2/2008 |
| EP | 3013053 | 4/2016 |
| EP | 3313144 | 4/2018 |
| EP | 3336685 | 9/2018 |
| GB | 2450422 | 12/2008 |
| GB | 2478583 | 9/2011 |
| GB | 2480825 | 12/2011 |
| GB | 2484736 | 4/2012 |
| GB | 2485613 | 5/2012 |
| GB | 2485977 | 6/2012 |
| GB | 2486411 | 6/2012 |
| GB | 2486412 | 6/2012 |
| GB | 2486431 | 6/2012 |
| GB | 2486434 | 6/2012 |
| GB | 2486457 | 6/2012 |
| GB | 2488094 | 8/2012 |
| GB | 2538797 | 11/2016 |
| JP | 2011508995 | 3/2011 |
| JP | 2012521268 | 9/2012 |
| JP | 2019041394 | 3/2019 |
| KR | 20160109066 | 9/2016 |
| TW | 1334716 | 12/2010 |
| WO | 2004014077 | 2/2004 |
| WO | 2005083558 | 9/2005 |
| WO | 2007020408 | 2/2007 |
| WO | 2009007693 | 1/2009 |
| WO | 2009013499 | 1/2009 |
| WO | 2009073824 | 6/2009 |
| WO | 2010138124 | 2/2010 |
| WO | 2010111100 | 9/2010 |
| WO | 2010114512 | 10/2010 |
| WO | 2010136781 | 12/2010 |
| WO | 2010144096 | 12/2010 |
| WO | 2011022014 | 2/2011 |
| WO | 2012022838 | 2/2012 |
| WO | 2012056198 | 5/2012 |
| WO | 2012066292 | 5/2012 |
| WO | 2012177378 | 12/2012 |
| WO | 2014096791 | 6/2014 |
| WO | 2014177869 | 11/2014 |
| WO | 2014195673 | 12/2014 |
| WO | 2014207439 | 12/2014 |
| WO | 2015079215 | 6/2015 |
| WO | 2015092356 | 6/2015 |
| WO | 2015150727 | 10/2015 |
| WO | 2015180663 | 12/2015 |
| WO | 2016016607 | 2/2016 |
| WO | 2016071670 | 5/2016 |
| WO | 2016097594 | 6/2016 |
| WO | 2016097689 | 6/2016 |
| WO | 2016110679 | 7/2016 |
| WO | 2016135441 | 9/2016 |
| WO | 2016142713 | 9/2016 |
| WO | 2016146992 | 9/2016 |
| WO | 2016151291 | 9/2016 |
| WO | 2016154801 | 10/2016 |
| WO | 2016174392 | 11/2016 |
| WO | 2016189294 | 12/2016 |
| WO | 2017021687 | 2/2017 |
| WO | 2017051171 | 3/2017 |
| WO | 2017060678 | 4/2017 |
| WO | 2017072483 | 5/2017 |
| WO | 2017072484 | 5/2017 |
| WO | 2017085462 | 5/2017 |
| WO | 2017098231 | 6/2017 |
| WO | 2017103571 | 6/2017 |
| WO | 2017191429 | 11/2017 |
| WO | 2017207971 | 12/2017 |
| WO | 2017214671 | 12/2017 |
| WO | 2018046892 | 3/2018 |
| WO | 2018055332 | 3/2018 |
| WO | 2018082904 | 5/2018 |
| WO | 2018145153 | 8/2018 |
| WO | 2018145154 | 8/2018 |
| WO | 2018200993 | 11/2018 |
| WO | 2018211287 | 11/2018 |
| WO | 2018223179 | 12/2018 |
| WO | 2018224841 | 12/2018 |
| WO | 2018224842 | 12/2018 |
| WO | 2018229458 | 12/2018 |
| WO | 2018229462 | 12/2018 |
| WO | 2019025760 | 2/2019 |
| WO | 2019100108 | 5/2019 |
| WO | 2019100109 | 5/2019 |

OTHER PUBLICATIONS

Taylor, Clark N.; et al. "Adaptive Image Compression for Wireless Multimedia Communication," University of California San Diego. 5 Pages.
Examination Report from related European application No. 18880508.9, dated Mar. 3, 2023. 3 pages.
Gonzalez, et al. "Digital Image Processing,"Pearson Prentice Hall. 36 pages.
Examination Report from related Taiwanese application No. 107141136. 7 pages.
Decision of Rejection from related Taiwanese application No. 107141137. 4 pages.
International Preliminary Report on Patentability for Application No. PCT/AU2018/050091, mailed on Apr. 6, 2018, 5 pages.
Extended European Search Report for European Application No. 18813535.4 dated Oct. 26, 2020, 9 pages.
European Search Report for Application No. PCT/AU2018/050091 mailed on Oct. 21, 2020, 28 pages.
European Search Report for related EP application No. 18881879.3, 10 pages.
Funt, et al. "Strategies for Foveated Compression and Transmission," Simon Fraser University, Vancouver, 4 pages.
Examination Opinions for Taiwan Patent Application No. 106119982 mailed on Feb. 3, 2021, 99 pages.
European Search Report for Application No. PCT/AU2018/051237 mailed on Jun. 21, 2024, 10 pages.
International Search Report and Written Opinion for Application No. PCT/AU2020/051115 mailed on Nov. 17, 2020, 12 pages.
Farid, et al. "Adaptive Wavelet Eye-Gaze Based Video Compression" School of Computer Science, Queen's University Belfast, 9 pages.
Yao J., et al., "A Novel Color Image Compression Algorithm using the Human Visual Contrast Sensitivity Characteristics," Photonic Sensors, 2017, vol. 7 (1), pp. 72-81.
European Search Report and Written Opinion for Application No. PCT/AU2017/050594 mailed on Jan. 28, 2020, 9 pages.
European Search Report for Application No. PCT/AU2018/050534 mailed on Oct. 26, 2020, 9 pages.
Australian Search Information Statement No. PCT/AU2018/051237 mailed on Jan. 30, 2019, 8 pages.
European Search Report for Application No. PCT/AU2017/050594 mailed on Jan. 28, 2020, 10 pages.
European Search Report for Application No. PCT/AU2018/051239, mailed on Feb. 25, 2021, 8 pages.

(56) References Cited

OTHER PUBLICATIONS

Extended European Search Report for International Patent Application No. PCT/2018/050090, dated Sep. 24, 2020, 19 pages.
Examination Report No. 1 for standard patent application for Australian Patent No. 2018217434, dated Mar. 24, 2022, 3 pages.
Gonzalez, et al. "Digital Image Processing," Pearson Education International. Third Edition. 976 pages.
European Search Report for European Patent Application No. 20876445.6, dated Jun. 28, 2024, 19 pages.
European Search Report for European Patent Application No. 20877466.1, dated Jul. 2, 2024, 10 pages.
Office Action of the Taiwan Intellectual Property Office for Taiwanese Invention Patent Application No. 107119228, dated Mar. 12, 2024, 12 pages.
Office Action of the Taiwan Intellectual Property Office for Taiwanese Invention Patent Application No. 107141136, dated Apr. 29, 2024, 11 pages.
Decision of Rejection of the Taiwan Intellectual Property Office for Taiwanese Invention Patent Application No. 107141136, dated Oct. 31, 2022, 6 pages.
Office Action of the Taiwan Intellectual Property Office for Taiwanese Invention Patent Application No. 110108737, dated Sep. 12, 2024, 2 pages.

\* cited by examiner

|  |  |  |  |  |  |  |  |
|---|---|---|---|---|---|---|---|
| $C_8$ | $C_5$ | $C_4$ | $C_5$ | $C_4$ | $C_3$ | $C_2$ | $C_2$ |
| $C_6$ | $C_5$ | $C_7$ | $C_6$ | $C_4$ | $C_3$ | $C_6$ | $C_2$ |
| $C_5$ | $C_6$ | $C_4$ | $C_4$ | $C_8$ | $C_3$ | $C_2$ | $C_1$ |
| $C_4$ | $C_4$ | $C_5$ | $C_6$ | $C_3$ | $C_2$ | $C_7$ | $C_1$ |
| $C_5$ | $C_7$ | $C_4$ | $C_5$ | $C_6$ | $C_2$ | $C_1$ | $C_1$ |
| $C_4$ | $C_5$ | $C_3$ | $C_2$ | $C_2$ | $C_1$ | $C_6$ | $C_0$ |
| $C_3$ | $C_2$ | $C_6$ | $C_1$ | $C_1$ | $C_7$ | $C_0$ | $C_0$ |
| $C_3$ | $C_1$ | $C_1$ | $C_0$ | $C_0$ | $C_0$ | $C_8$ | $C_0$ |

CONTENT COMPRESSION FOR NETWORK TRANSMISSION

BACKGROUND OF THE INVENTION

The present invention relates to a system and method for controlling content compression for transmission via a communications network, and in one particular example, a system and method for dynamically adjusting content compression for each of a plurality of users based on network performance and/or user requirements.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In virtual, augmented and mixed reality systems, it is typical to provide a wearable display device, such as a Head Mounted Display (HMD), which displays information to a wearer based on the relative spatial position and/or orientation of the display device. Such systems operate by generating images based on information regarding the pose (position and orientation) of the display device, so that as the display device moves, the images are updated to reflect the new pose of the display device.

In order to avoid motion sickness, it is important that the time difference between collection of the pose information and creation of the corresponding image is minimised, particularly in circumstances where the display device is moving rapidly. This, coupled with the need to generate high resolution images so that these appear as lifelike as possible, means that significant processing hardware is required. As a result, high end existing systems typically require a static desktop computer with a high bandwidth and low latency connection to the display device. Consequently, current systems such as the HTC Vive™, Oculus Rift™, Valve Index™, and Playstation VR™ require a wired connection between the computer and the HMD, which is inconvenient.

Whilst mobile solutions are available, such as the Gear VR™, which incorporates a mobile phone to perform the processing and display of images within the HMD itself, the processing ability is limited, meaning the content that can be displayed is restricted, particularly in terms of the image resolution and quality.

More recently, compression schemes for compressing image data to allow it to be transmitted wirelessly are known.

WO2017/214671 describes a method of compressing image data from one or more images forming part of digital reality content, the method including obtaining pixel data from the image data, the pixel data representing an array of pixels within the one or more images; determining a position of the array of pixels within the one or more images relative to a defined position, the defined position being at least partially indicative of a point of gaze of the user; and compressing the pixel data at least partially in accordance the determined position so that a degree of compression depends on the determined position of the array of pixels WO2018/223179 describes a method of compressing image data from images forming part of a digital content stream, the method including for a sequence of n images within the digital content stream, obtaining image data for each of the n images and compressing the image data for at least some of the n images using a respective compression scheme.

WO2019/100109 describes a method of compressing image data representing one or more images, the method including obtaining pixel data from the image data, the pixel data representing an pixel array within the one or more images, applying a transformation to the pixel data to determine a set of frequency coefficients indicative of frequency coefficients of the pixel array, encoding a selected subset of the set of frequency coefficients, generating an index indicative of the encoded frequency coefficients and generating compressed image data using the encoded frequency coefficients and the index.

WO2019/100108 describes a method of displaying images forming part of a digital reality stream, the method including, for each image to be displayed in one or more encoder processing devices, generating compressed image data by differentially compressing image data indicative of the image in accordance with system operation and the content of the digital reality stream so that different parts of the image are compressed using a different degree of compression, wirelessly transmitting the compressed image data to a display device using a wireless communications link, and, in one or more decoder processing devices associated with the display device, differentially decompressing the compressed image data to thereby generate image data indicative of the image to be displayed.

However, whilst such systems work well for point to point connections, these do not necessarily allow transmission via communications networks that are subject to inherent bandwidth and latency limitations, particularly when these networks are being used by multiple users.

SUMMARY OF THE PRESENT INVENTION

In one broad form the present invention seeks to provide a system for controlling content compression for transmission via a communications network used to serve content to a plurality of users, the system including one or more processing devices configured to: acquire one or more network metrics indicative of communications network performance; acquire one or more user metrics for each of the plurality of users, the one or more user metrics being indicative of content display requirements associated with each user; dynamically calculate a target compression for each of the plurality of users at least in part based on at least one of the network metrics and the user metrics; and, cause content for each user to be compressed in accordance with the target compression for that user.

In one broad form the present invention seeks to provide a method for controlling content compression for transmission via a communications network used to serve content to a plurality of users, the method including, in one or more processing devices: acquiring one or more network metrics indicative of communications network performance; acquiring one or more user metrics for each of the plurality of users, the one or more user metrics being indicative of content display requirements associated with each user; dynamically calculating a target compression for each of the plurality of users at least in part based on the network metrics and the user metrics; and, causing content for each user to be compressed in accordance with the target compression for that user.

In one broad form the present invention seeks to provide a computer program product for controlling content compression for transmission via a communications network used to serve content to a plurality of users, the computer program product including computer executable code, which when executed on one or more suitably programmed processing devices causes the one or more processing devices to: acquire one or more network metrics indicative of communications network performance; acquire one or more user metrics for each of the plurality of users, the one or more user metrics being indicative of content display requirements associated with each user; dynamically calculate a target compression for each of the plurality of users at least in part based on the network metrics and the user metrics; and, cause content for each user to be compressed in accordance with the target compression for that user.

In one embodiment the one or more processing devices are configured to calculate the target compression at least in part based on an available network bandwidth for transferring content to all of the users.

In one embodiment the one or more processing devices are configured to: determine an available network bandwidth using at least one network metric; and, calculate a target bandwidth for each of the plurality of users using at least one user metric.

In one embodiment the one or more processing devices are configured to calculate the target compression for each user using the target bandwidth and at least one of: user metrics; a target quality; and, a content size.

In one embodiment the network includes a plurality of nodes, and wherein the one or more processing devices are configured to dynamically calculate a target compression for each of the plurality of users on each node.

In one embodiment the network metrics include any one or more of: current network loads; a network bandwidth; a network latency; at least one network error metric; a user quality of service; and, a network quality of service.

In one embodiment the network metrics are defined for different parts of a network, and wherein the one or more processing devices are configured to determine a target compression at least one of: for each part of the network; for each user; for each user on each part of the network; and, for each part of the network independently.

In one embodiment the content is displayed using a display device, and wherein the user metrics include any one or more of: user configuration metrics indicative of: a user type; a user priority; and, a user target quality; content metrics indicative of: a content type; a content of different parts of an image; an opacity of different parts of an image; areas of interest within an image; locations of interest within an image; one or more cues associated with an image; and, one or more display objects within an image; display device configuration metrics indicative of at least one of: a display device type; a display device frame rate; a display device resolution; a display device field of view; and, display device lens attributes; and, display device status metrics indicative of at least one of: a display device pose relative to the environment; a display device movement relative to the environment; a display device acceleration relative to the environment; input commands provided by a user; a user gaze; and, a physiological attribute of the user.

In one embodiment the one or more processing devices are configured to calculate at least one of the target bandwidth and a target quality for each of the plurality of users using at least one of: network metrics; user configuration metrics; content metrics; display device configuration metrics; and, display device status metrics.

In one embodiment the one or more processing devices are configured to calculate the target compression using one or more of: a target bandwidth; a target quality; and, display metrics.

In one embodiment the one or more processing devices are configured to determine the user metrics from at least one of: a service provider providing user configuration metrics; a user providing user configuration metrics; a display device providing at least one of: display device configuration metrics; and, display metrics; and, a content engine configured to generate content for the user, the content engine providing content metrics.

In one embodiment the one or more processing devices include: a network controller configured to calculate at least one of a target bandwidth and target quality for each user; and, a plurality of encoders, each encoder being associated with a content engine generating content for a respective user, wherein the encoders are configured to calculate the target compression for the respective user.

In one embodiment each encoder is configured to: receive display device status metrics; pass the display device status metrics to the content engine to allow the content engine to generate the content; calculate the target compression using at least the display device status metrics and at least one of the target bandwidth and a target quality; receive the content from the content engine; and, encode the content in accordance with the target compression.

In one embodiment the one or more processing devices are configured to calculate a target bandwidth at least one of: substantially in real time; every second; every image; every 11 ms; hundreds of times a second; and, hundreds of times per image.

In one embodiment the one or more processing devices are configured to calculate the current target compression at least one of: substantially in real time; for each of a plurality of images within the content; for each of multiple different parts of each of a plurality of images within the content; for multiple different pixel arrays within each of a plurality of images within the content; and, hundreds of times per image.

In one embodiment the one or more processing devices are configured to: select a target frame rate in accordance with at least one of a target compression and target bandwidth; and, cause content to be at least one of generated and compressed in accordance with the frame rate.

In one embodiment the one or more processing devices are configured to: select a compression scheme in accordance with the target compression; and, compress the content using the selected compression scheme.

In one embodiment the one or more processing devices are configured to perform compression of images within the content by: obtaining pixel data from image data, the pixel data representing a pixel array within the one or more images; applying a transformation to the pixel data to determine a set of frequency coefficients indicative of frequency coefficients of the pixel array; encoding a selected subset of the set of frequency coefficients, the subset being selected to preferentially encode frequency coefficients having a higher magnitude; generating an index indicative of the encoded frequency coefficients; and, generating compressed image data using the encoded frequency coefficients and the index.

In one embodiment the one or more processing devices are configured to select the subset of the set of frequency coefficients by selecting frequency coefficients having progressively smaller numbers of bits.

In one embodiment the index is indicative of: a number of bits of each encoded frequency coefficient; and, a location, the location being at least one of: a location of each encoded frequency coefficient in a defined sequence; and, a location of each encoded frequency coefficient within the coefficient matrix.

In one embodiment the defined sequence is at least one of: a zig-zag traversal of a coefficient matrix; and, an ordered list.

In one embodiment the one or more processing devices are configured to select the subset of the set of frequency coefficients based on at least one of: the target compression; content metrics; display device configuration metrics; and, display device status metrics.

In one embodiment the one or more processing devices are configured to select the subset of the set of frequency coefficients so that: different parts of the image are compressed using a different degree of compression; and, the target compression is maintained across one or more images.

In one embodiment the one or more processing devices are configured to: determine the target compression; select a bit encoding scheme at least in part in accordance with the target compression; and, encode the set of frequency coefficients in accordance with the bit encoding scheme and wherein the index is indicative of the selected bit encoding scheme.

In one embodiment the one or more processing devices are configured to: encode a number of pixel arrays using the selected bit encoding scheme; and, select a next bit encoding scheme based on compression of the number of pixel arrays.

In one embodiment the one or more processing devices are configured to select the bit encoding scheme using at least one of: a cumulative bit total for a number of previous pixel arrays; a target bit rate based on the target compression; a position of the pixel array within the one or more images; the target compression; content metrics; display device configuration metrics; and, display device status metrics.

In one embodiment the one or more processing devices are configured to: determine a cumulative bit total for a number of previous pixel arrays; and, if the cumulative bit total exceeds a cumulative bit total threshold: determine a degree of compression for the number of previous pixel arrays; and, select the bit encoding scheme using the degree of compression and the target degree of compression.

In one embodiment the bit encoding scheme encodes the frequency coefficients by at least one of: encoding a subset of frequency coefficients; and, scaling the frequency coefficients with a scaling factor and encoding the scaled frequency coefficients.

In one embodiment the one or more processing devices are configured to: identify a highest magnitude frequency coefficient; calculate a minimum scaling factor required to reduce the highest magnitude frequency coefficient to a target number of bits; and, scale the frequency coefficients using at least one of: the minimum scaling factor; and, a scaling factor larger than the minimum scaling factor.

In one embodiment the one or more processing devices are configured to: select one of a number of bit encoding schemes, wherein each bit encoding scheme defines: available scaling factors; and, a bit threshold, wherein frequency coefficients are selectively encoded in accordance with the bit threshold; scale frequency coefficients using an available scaling factor that is at least a minimum scaling factor; and, encode scaled frequency coefficients in accordance with the bit threshold by at least one of: encoding scaled frequency coefficients having more bits than the bit threshold; and, discarding scaled frequency coefficients having less bits that the bit threshold.

In one embodiment each bit encoding schemes defines at least one of: a respective bit threshold for different colour channels; a respective bit threshold for luminance and chrominance channels; and, a higher bit threshold for chrominance channels than the luminance channel.

In one embodiment the bit encoding scheme defines a bit threshold for each of chrominance and luminance colour channels, and wherein the system includes, for each colour channel: applying the transformation to the pixel data; calculating a minimum scaling factor; selecting the scaling factor; scaling the frequency coefficients; and, encoding the subset of the scaled frequency coefficients.

In one embodiment the one or more processing devices are configured to select a bit encoding scheme from an ordered list of bit encoding schemes, the list being ordered to provide progressively increasing compression.

In one embodiment the bit encoding schemes provide progressively increasing compression by at least one of: progressively increasing the magnitude of the available scaling factors; reducing a lowest available scaling factor; and, progressively increasing the bit threshold.

In one embodiment the available scaling factor is at least one of: 1; 2; 4; and, 8.

In one embodiment the bit threshold is at least one of: 0; 1; 2; 3; 4; 5; and, 6.

In one embodiment the content is displayed on a display device, and wherein the display device includes a decoder that is configured to decompress compressed content.

In one embodiment the decoder is configured to: obtain compressed image data including encoded frequency coefficients and an index indicative of the encoded frequency coefficients; decode the encoded frequency coefficients to obtain a subset of frequency coefficients; generate a set of frequency coefficients using the subset of frequency coefficients and the index; and, apply an inverse transformation to the set of frequency coefficients to determine pixel data representing a pixel array within the one or more images.

In one embodiment the method includes, using the decoded frequency coefficients and the index to reconstruct at least one of: a set of frequency coefficients; a defined sequence of frequency coefficients; and, a coefficient matrix.

In one embodiment the method includes: decoding each encoded frequency coefficient; determining the location of each frequency coefficient; adding the decoded frequency coefficient into at least one of the defined sequence and coefficient matrix in accordance with the location; and, adding null values into empty locations in at least one of the defined sequence and coefficient matrix.

In one embodiment the method includes: determining an index code from the compressed image data; and, determining the index from the index code.

In one embodiment the system is used for at least one of: compressing digital reality data; transmitting digital reality data; and, wirelessly transmitting digital reality data.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:—

DETAILED DESCRIPTION OF THE PREFERRED EMBODIMENTS

Figure 1:
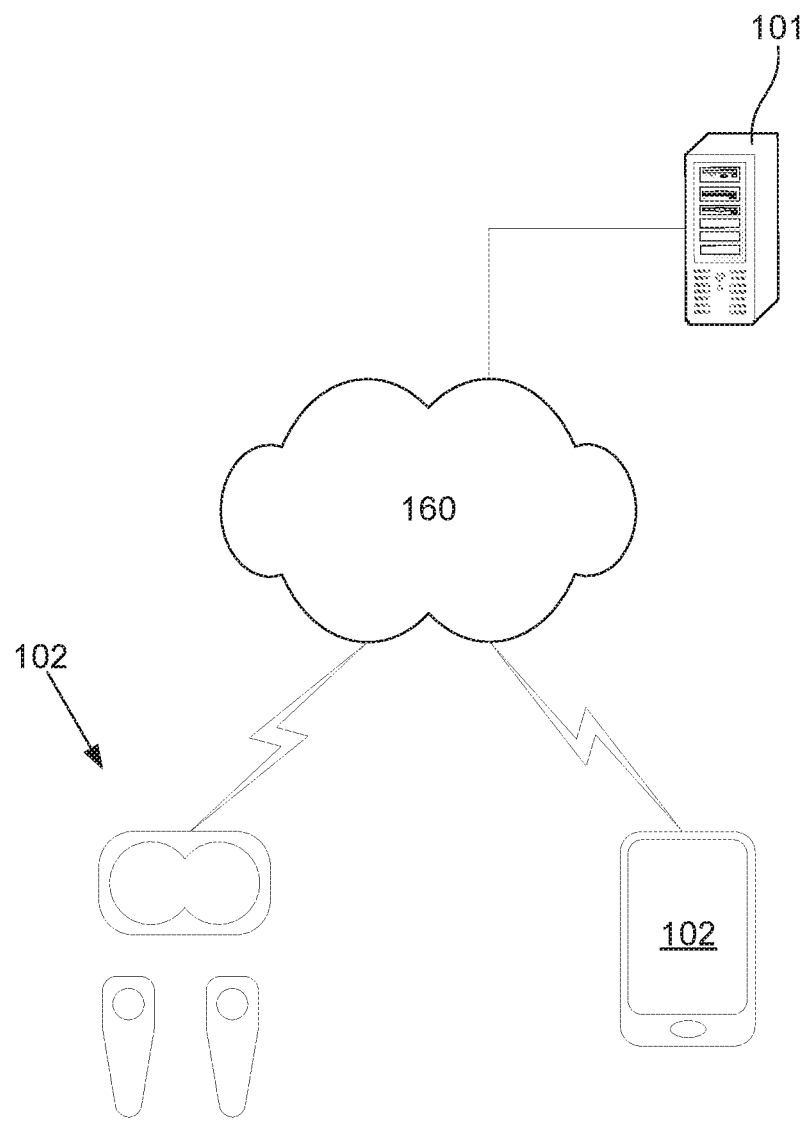
FIG. 1 is a schematic diagram of an example of a simplified communications network environment.

An example of a system including a communications network environment will now be described with reference to FIG. 1.

In this example, the system includes one or more electronic processing devices 101, connected to one or more display devices 102, via a network 160.

The network 160 could include one or more wired or wireless networks, including, but not limited to mobile networks, private networks, such as 802.11 networks, the Internet, LANs, WANs, or the like. In one example, at least part of the network 160 is formed from a 4G or 5G cellular network allowing this to be used for both mobile and fixed wireless applications.

The one or more electronic processing devices 101 are configured to compress, and optionally generate, content that is to be displayed on the display devices 102, allowing this to be transmitted via the network 160. In this regard, by compressing the content, this reduces the size of the content, thereby reducing the volume of data that needs to be transmitted by the network 160, in turn allowing content to be provided to multiple users more effectively.

The one or more electronic processing devices 101 typically forming part of one or more processing systems, such as computer systems, servers, or the like. In one example, the one or more electronic processing devices 101 are at least partially formed from edge servers, which are a type of edge device that provides an entry point into a network, and is typically provided in a physical location close to the location of the end users, such as in Internet exchange point close to the user. However, this is not essential, and a variety of different forms of processing device could be used, depending on the preferred implementation. For ease of illustration the remaining description will refer to generally to a processing device, but it will be appreciated that multiple processing devices could be used, with processing distributed between the processing devices as needed, and that reference to the singular encompasses the plural arrangement and vice versa.

The display devices 102 are used to allow content to be displayed and could be of any suitable form depending on the nature of the content. For example, the display devices 102 could include client devices, such as mobile phones, portable computers, tablets, or the like, or could include dedicated display devices, such as wearable or head mounted displays, such as virtual, mixed or augmented reality headsets, or the like.

The nature of the content could vary depending on the preferred implementation. In one example, the content could include image data representing one or more images, and in particular, a sequence of images to be displayed on a respective display device. As will be apparent from the following description, in one specific example, the image data is a sequence of images forming part of a digital content stream adapted to be displayed remotely to a source, such as in virtual, augmented or mixed reality graphics applications in which images are displayed on a wearable display, and/or in telepresence applications, in which images are displayed from a remote controllable system, such as a drone mounted camera, or the like. However, it will be appreciated that whilst the techniques described herein are particularly useful for digital reality applications, this is not intended to be limiting, and the techniques could be used for any content stream, such as a video stream, computer graphics, or the like.

Figure 2:
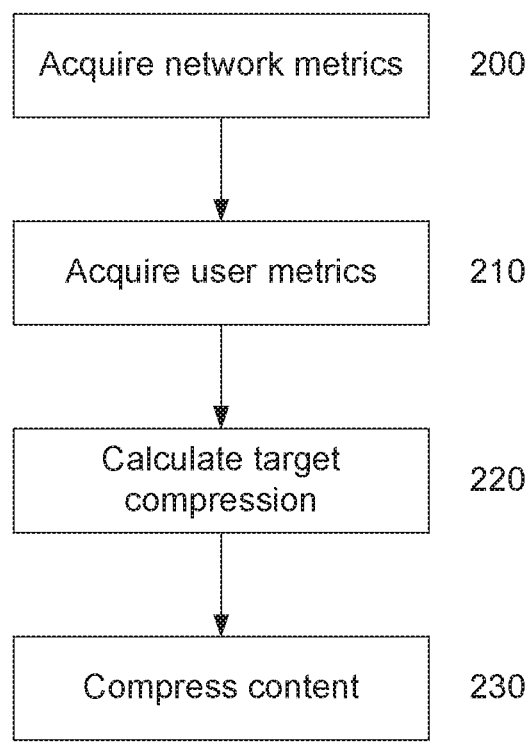
FIG. 2 is a flow chart of an example of a method of controlling content compression for transmission via a communications network.

An example of the process performed by the system to control content compression for transmission via a communications network will now be described in more detail with reference to FIG. 2.

In this example, at step 200, the processing device 101 acquires one or more network metrics indicative of communications network performance. The nature of the network metrics, and the manner in which these are acquired, will vary depending on the preferred implementation. For example, the network metrics could include an indication of current network loads and/or bandwidth, or the like, and could be determined by analysing network traffic, receiving an indication of the network metrics from hardware responsible for managing network traffic, or the like.

At step 210, the processing device 101 acquires one or more user metrics for each of a plurality of users, with the user metrics being indicative of content display requirements associated with each user. In this regard, for the purpose of the following, users are assumed to be any individuals using the network to access content whose compression is to be controlled using the current process. It will be noted however that this does not preclude the network being used by other users that are not having content compressed in accordance with the herein described scheme, and the term should not be considered as referring to all network users, but rather only those users whose content is to be compressed.

The nature of the user metrics, and the manner in which these are acquired, will vary depending on the preferred implementation. For example, the user metrics could include metrics relating to the users display device, including the display device use and/or configuration, which might be received from the display device. Other metrics can include user preferences, such as a priority assigned to the user, or the like, which could be obtained from a service provider, from a user, or similar, and further examples will be described in more detail below.

At step 220, the processing device 101 dynamically calculates a target compression for each of the plurality of users at least in part based on the network metrics and the user metrics. The manner in which this is performed will vary depending on the preferred implementation and the nature of the metrics available, but typically this involves using network metrics to calculate a total bandwidth available, with part of this being allocated to each user depending on user metrics, thereby allowing a required compression for each user can be calculated based on the bandwidth available for that user.

At step 230, the processing device 101 causes content for each user to be compressed in accordance with the target compression for that user, for example by arranging for an encoder to perform the compression based on the target compression. This can be performed using any suitable compression scheme, and may involve selecting one of a number of different compression schemes, based on the target compression. An example scheme and the manner in which this can be used will be described in more detail below.

Accordingly, the above described system operates to analyse a combination of metrics, including network and user specific metrics, using these to calculate a target compression for the content that is delivered to each user, thereby optimising the compression both for the network and for individual users.

For example, this helps ensure that content for all the users is collectively compressed sufficiently to allow this to be transmitted using the available bandwidth. This in turn helps ensure that content is delivered to users as efficiently as possible, and in particular avoids the latency associated with transmission delays, whilst ensuring the network is not overloaded.

Additionally, as the above described process takes into account user metrics, this also allows the compression to be adjusted for each user. For example, this can be performed so that each user receives content that has a similar level of perceivable detail. Additionally and/or alternatively, this can be based on a range of factors, including user preferences, the nature of the content and how this is displayed. For example, quality limitations could be used so that a user paying a premium has a lower level of compression than other users. Alternatively, for user's with a lower resolution display device, a higher level of compression could be used as the increase in compression would not be perceivable on that device. Compression levels could also be controlled based on the content, so that content that is sensitive to compression, could be compressed by a reduced amount.

Accordingly, it will be appreciated that the above described approach can help improve the quality of content provided to multiple users in a manner which is fair to all users, whilst maintaining network performance.

Whilst the above has been described with respect to content presented by a display device, it will be appreciated that the techniques could be applied to any content that requires compression, and not necessarily content that is configured to be visually displayed.

A number of further features will now be described.

In one example, the target compression is calculated at least in part based on an available network bandwidth for transferring content to all of the users, so that the target compression for each user is tailored to ensure there is sufficient network bandwidth to transmit compressed content to all of the users, optionally also allowing additional capacity for other forms of content, as required.

In one example, in order to achieve this, the processing device is configured to calculate a total available bandwidth using at least one network metric, and then use this to calculate a target bandwidth for each of the plurality of users using at least one user metric. Thus, the processing device can calculate a target bandwidth for each of the plurality of users by using the network metrics to determine a total bandwidth available for transferring content to all of the users, and then allocating part of this to individual users based on the user metrics. In this regard, by allocating part of the total bandwidth based on the user metrics, this can take into account user preferences, priorities, requirements associated with the content, or the like.

For example, if a user has a premium subscription, they may be allocated a greater bandwidth. Similar, if a user is viewing content that is difficult to compress, or that has high quality requirements, or is larger in volume, they may be allocated a greater bandwidth, thereby reducing compression requirements.

It will be appreciated that the target bandwidth can be calculated using appropriate optimization techniques that are able to examine a number of variables and calculate an optimum distribution of bandwidth. Examples of these include load balancing algorithms, and as these are known in the art from other applications, these will not be described in detail.

Having determined the target bandwidth for each user, the processing device can calculate the target compression for each user using the target bandwidth and any one or more of the user metrics, a target quality and a content size, such as a number of bytes defining each image frame. In this regard, it will be appreciated that this ensures compression is optimized not only based on the target bandwidth, but also taking into account other factors, such as the user metrics, content size and/or quality, thereby making sure the content is compressed effectively. Thus, for example, content containing a high volume of data may require a greater degree of compression, in order to ensure the target bandwidth requirements are met.

Accordingly, it will be appreciated that the above described processes take into account a range of different metrics in order to allocate users an appropriate target bandwidth, which is suitable for their content and which takes into account user preferences, with this then being used to calculate an amount of compression required in order to allow the content to be transmitted within the target bandwidth constraint. This ensures that multiple different users are all able to receive content which has been compressed in a manner tailored to that user and the nature of the content.

Typically the network includes a plurality of nodes, such as a plurality of transmission antennas and/or base stations in a wireless network. In this case, the processing device can be configured to dynamically calculate a target compression for each of the plurality of users on each node. This allows the optimization to be performed on a per node basis, thereby reducing compression on under-utilized loads, and increasing compression on heavily used loads, thereby helping ensure effectiveness of individual nodes, as well as the network as a whole. It will be appreciated based on this that optimization can be performed at a network level and/or a node level, depending on the preferred implementation and the network requirements.

In one example, the processing device is configured to calculate a target bandwidth substantially in real time. This allows the compression to be rapidly adapted to changing network conditions, for example increasing target bandwidths and thereby relaxing compression as network loads ease and reducing bandwidth and hence increasing compression as network loads rise. In one example, the processing device is configured to calculate target bandwidths, every second, each time an image to be displayed, such as every 11 ms (which corresponds to a typical image display time for 90 Hz refresh rate displays), or at higher rates, up to and including hundreds of times a second or hundreds of times per image frame. It will be appreciated that the more frequently this is performed, the more rapidly the system is able to accommodate changes in network operation.

Similarly, the processing devices can be configured to calculate the current target compression substantially in real time, and typically at least for each of a plurality of images within the content, but optionally for different parts of each of a plurality of images, or for multiple different pixel arrays within each of a plurality of images within the content, or hundreds of times per image frame.

The above described processes can be performed using a variety of different network metrics. For example, the network metrics could include any one or more of current network loads, a network bandwidth, a network latency, at least one network error metric, a user quality of service, a network quality of service, or the like. Furthermore, these metrics could be calculated for the network as a whole and/or for each node, so that a network quality of service should be understood as encompassing a node quality of service. It will therefore be appreciated that the term network metric will be understood to include any metric reflective of the ability of the network to transfer data to the user and it will be appreciated that other metrics could be used depending on their availability.

The user metrics typically include user configuration metrics indicative of a user type, a user priority or a user target quality. Thus, user configuration metrics typically take into account user preferences or settings that are typically established during a configuration process, for example, when a user signs up to a service provider and/or when a user initiates a content streaming session. Thus, as mentioned above, if a user has signed up for a higher quality streaming experience, they can be allocated a higher bandwidth than otherwise, allowing the user to benefit from reduced content compression and, hence, potentially improved content quality.

User metrics can also include content metrics indicative of a content type, a content of different parts of an image, an opacity of different parts of an image, areas of interest within an image, locations of interest within an image, one or more cues associated with an image or one or more display objects within an image. Thus, this can take into account the nature of the content, allowing this to be compressed in the most effective manner possible, and taking into account the extent to which the content can be compressed whilst minimizing the perceivable reduction in quality. For example, if a user is viewing relatively simple content, this can often be compressed more than more complex content, without the user perceiving a reduction in content quality, allowing the user to be allocated a reduced bandwidth, and hence allowing higher compression to be used.

In one example, the user metrics include display device configuration metrics indicative of at least one of a display device type, a display device frame rate, a display device resolution, a display device field of view or display device lens attributes. Thus, for example, a display device with a lower resolution/field of view can typically accommodate a higher degree of compression that a higher resolution/field of view device, without any perceived lack in image quality, allowing this information to be used in allocating bandwidth to each user.

The user metrics could also include display device status metrics indicative of current display device operation. This could include information such as a display device pose relative to the environment, a display device movement relative to the environment, a display device acceleration relative to the environment, input commands provided by a user, a user gaze or a physiological attribute of the user. For example, if a display device is moving rapidly, the level of detail a user can perceive in an image is typically reduced compared to if the display device is static. Accordingly, if a user's display is moving, the user will typically not notice an increase in compression and hence can be allocated a reduced bandwidth.

Accordingly, it will be appreciated from the above that the processing device can be configured to calculate a target bandwidth or a target quality for each of the users using network metrics, user configuration metrics, content metrics, display device configuration metrics and/or display device status metrics. Similarly, having determined a target bandwidth, the processing device can calculate the target compression using the target bandwidth, a target quality or display metrics. This allows the target bandwidth and target compression for each user to be tailored to that user's particular situation, thereby helping maximize the compression used for each user, while minimizing any perceived reduction in quality.

This, it will be appreciated that by minimizing the target bandwidth and maximizing compression for users that will not perceive a reduction in quality, this can be used to increase the bandwidth allocated to users that would perceive a reduction in quality, thereby helping ensure that each user has a similar experience in terms of the quality of the content viewed.

The manner in which the user metrics are determined will vary depending on the nature of the user metrics. For example, the processing device can be configured to determine the user configuration metrics from service provider that provides the user with access to the network and/or associated services, such as access to streaming content. In this instance, the processing device can typically determine the user configuration metrics either when a user first signs up to a service, or when a content session, such as a gaming session or similar, commences.

The display device configuration metrics and display metrics are typically received from a display device. As the display device configuration metrics are static, these are typically provided as a one off process at the start of a session, whilst the display metrics typically change over time as the display device is used and hence are provided by the display device substantially constantly throughout a session.

Content metrics are typically provided by a content engine that is configured to generate content for the user, with these typically being provided substantially constantly as new content is generated.

In order to implement the above described functionality, the one or more processing devices can include a network controller configured to calculate at least one of a target bandwidth and target quality for each user. The one or more processing devices can also include a plurality of encoders, with each encoder being associated with a content engine generating content for a respective user. In this case, the encoders can be configured to calculate the target compression for the respective user. Thus, a respective encoder is provided for each user, with this managing the compression of the content for that user, whilst a controller manages the bandwidth allocation to each user. This reduces overheads on the encoder, allowing it to be perform the encoding rapidly, which is important in reducing latency. In contrast, the controller requires oversight of the operation of the network and each of the encoders, and hence a single controller is provided.

It will be appreciated that the controller and encoders can be implemented as software, for example running on a hardware platform including one or more servers, such as edge servers in a cloud computing environment. Additionally, and/or alternatively, the controller and/or encoders could be implemented using dedicated hardware. This is particularly beneficial in ensure compression is performed rapidly to reduce latency, and an example configuration will be described in more detail below.

In use, each encoder is configured to receive display device status metrics from the display device, and pass the display device status metrics to the content engine to allow the content engine to generate the content. In this regard, this allows the content engine to use inputs, such as a headset pose or movement, in order to generate content that is suitable for display on the headset. As the content is being generated, the encoder can calculate the target compression using at least the display device status metrics and at least one of the target bandwidth and a target quality, as supplied by the controller. The encoder then receives the content from the content engine, allowing the encoder to encode the content in accordance with the target compression.

It will be appreciated that the target compression could change significantly, depending on factors such as network loading or similar. Additionally, some compression schemes might work well for some types of content, but not for others. Accordingly, in one example the processing device is configured to select a compression scheme in accordance with the target compression and then compress the content using the selected compression scheme.

Thus, for example, the processing device could select to use a standard existing compression scheme, such as JPEG, if this provides a sufficient degree of compression. Alternative other compression schemes could be used if additional compression and/or reduced latency is required, and an example compression schemes can be found in copending applications WO/2017/214671, WO2018/223179, WO/2019/100108 and WO/2019/100109, the contents of which are incorporated herein by cross reference. A specific example compression scheme will also be described in more detail below.

Figure 3:
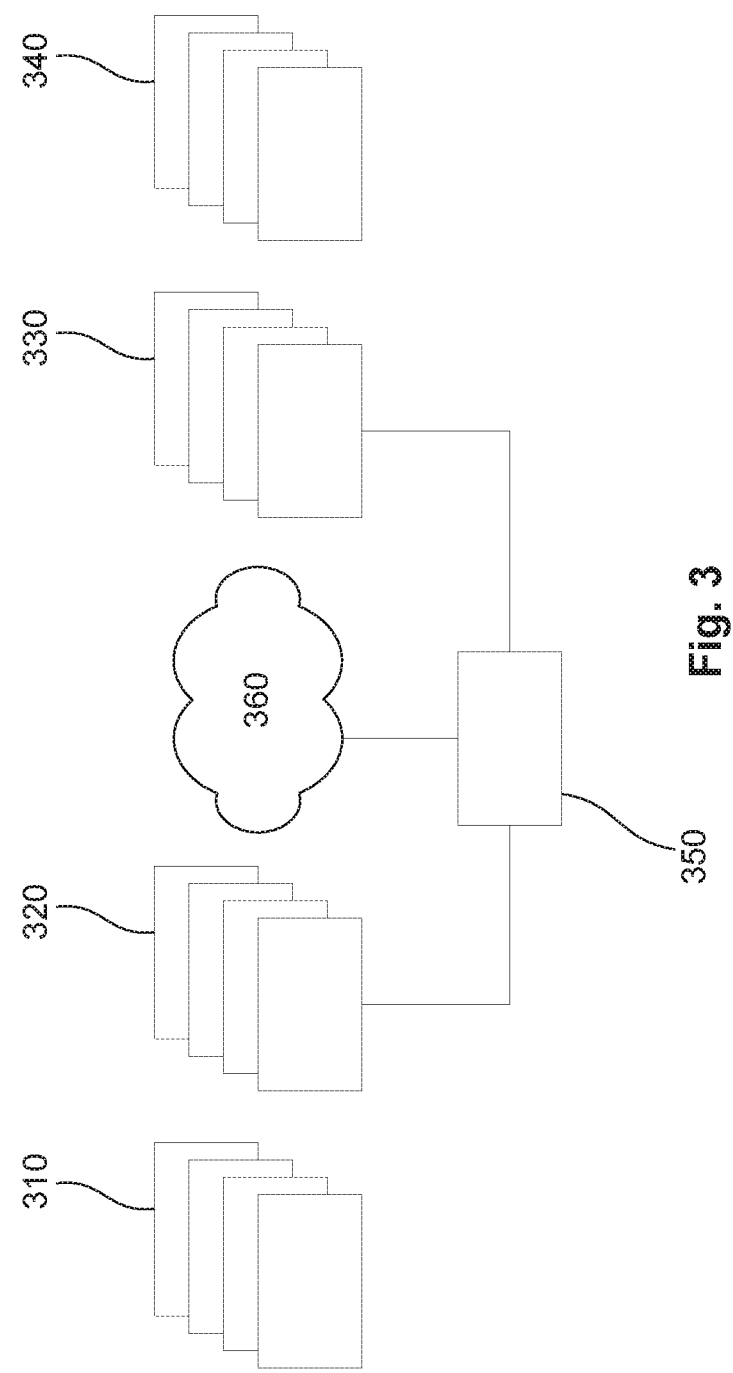
FIG. 3 is a schematic diagram of an example of system functionality for controlling content compression for transmission via a communications network.

An example of a system for controlling content compression will now be described in more detail with reference to FIG. 3.

In this example, the system includes a number of content engines 310, coupled to a corresponding number of encoders 320. The encoders 320 are connected via the communication network 360, to respective decoders, which are in turn connected to display devices 340. Whilst shown as separate entities, the decoders can be integrally formed with the display device, for example through the use of an embedded decoder integrated circuit within the display device.

A single controller 350 is provided, which is in operative communication with the encoders 320 and decoders 330. For example, the controller could be directly coupled to the encoders, and could be connected to the decoders via the network. Alternatively, communication from the decoders could be routed via the encoders, depending on the preferred implementation. In any event this allows the controller 350 to receive feedback regarding the compression/decompression of the content, and use this in calculating target bandwidths, qualities and/or compression levels.

This arrangement provides a highly parallelized architecture, in which content is generated, encoded, decoded and display for each user independently. Nevertheless, a common controller 350 is provided, allowing overall control of compression to be performed and coordinated, so that the compression of content for each user is customized depending on user metrics, whilst taking into account available bandwidth across the network. This also allows the system to be rapidly scaled for additional users simply by adding additional content engines and encoders.

Figure 4:
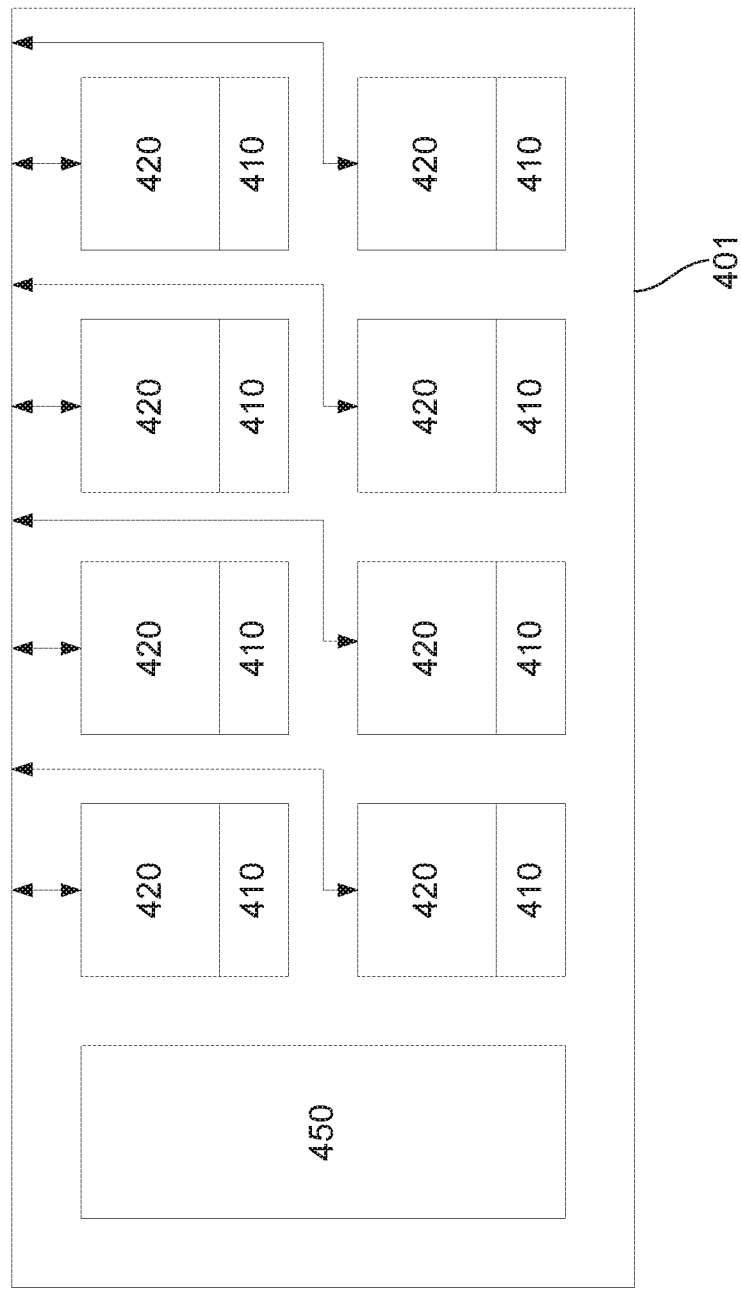
FIG. 4 is a schematic diagram of an example of a server configuration for controlling content compression for transmission via a communications network.

In one example, the above described arrangement is implemented in a server-based architecture, and an example of this is shown in FIG. 4. In this example, a hardware server 401 is provided, which implements the functionality of the controller 450, as well as multiple content engines 410 and encoders 420. However, it will also be appreciated that the encoders and content engines could be formed from respective hardware and an example of this is described in more detail below.

Figure 5:
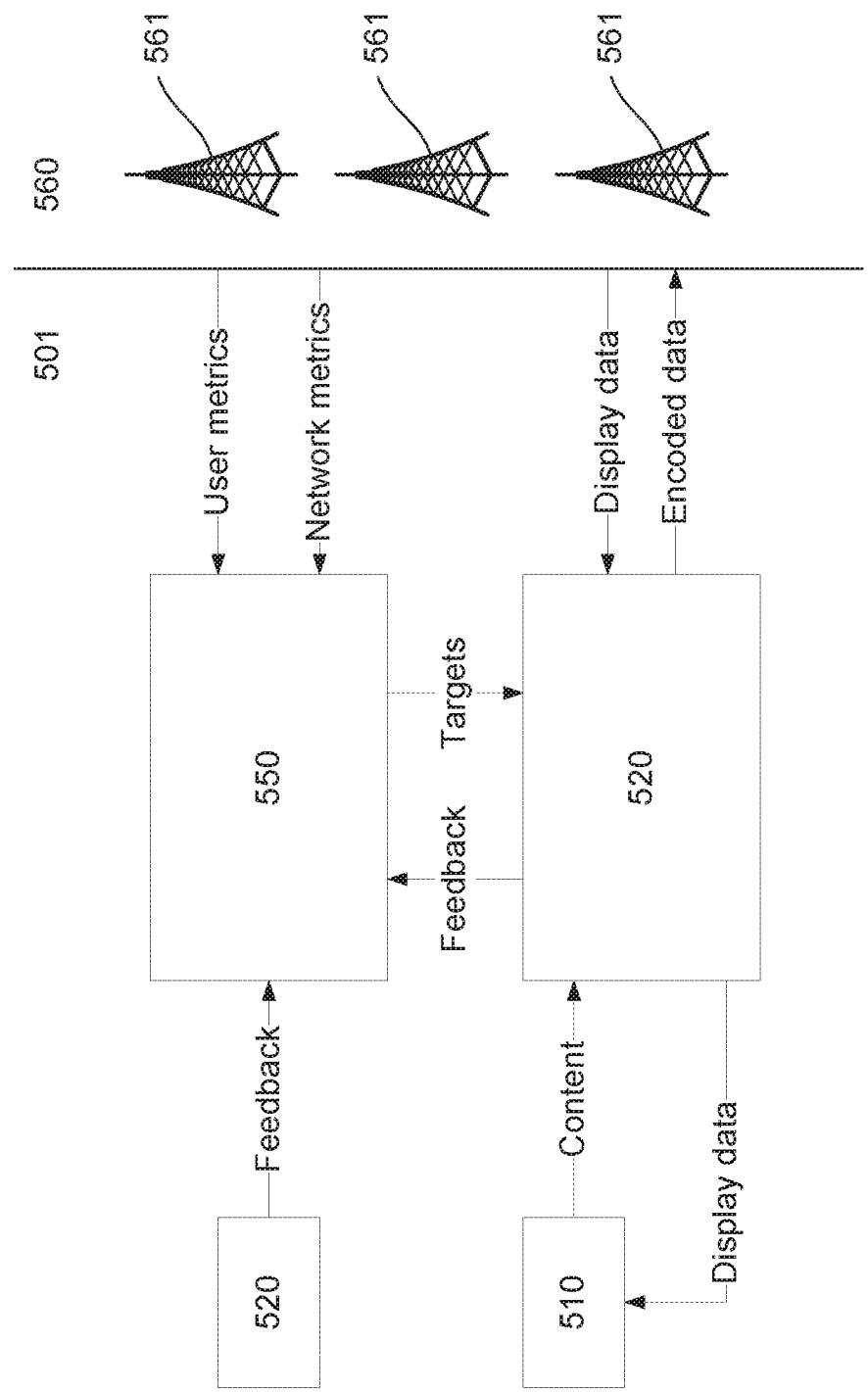
FIG. 5 is a schematic diagram of an example of a functional configuration for controlling content compression for transmission via a communications network.

An example of the functionality for encoding a single content stream will now be described in more detail with reference to FIG. 5.

In this example, the controller 550, encoder 520 and content engine 510 are provided in an edge server 501, which is in turn connected to the communications network 560, which in this example includes a number of radio antenna nodes 561. In use, the encoder receives display data including display device status metrics from a decoder via the network 560. Display data is passed on to the content engine 510, which returns content and content metrics to the encoder 520. This allows the encoder to compress the content, supplying encoded content via the network 560 for transmission to a decoder and display device (not shown).

The controller 550 receives user configuration metrics and network metrics via the communications network, as well as receiving feedback, such as content metrics and display metrics from the encoders. The controller 550 generates targets, including a target bandwidth and/or quality and provides this to the encoder 520, allowing this to perform the compression based on the target bandwidth.

Figure 6:
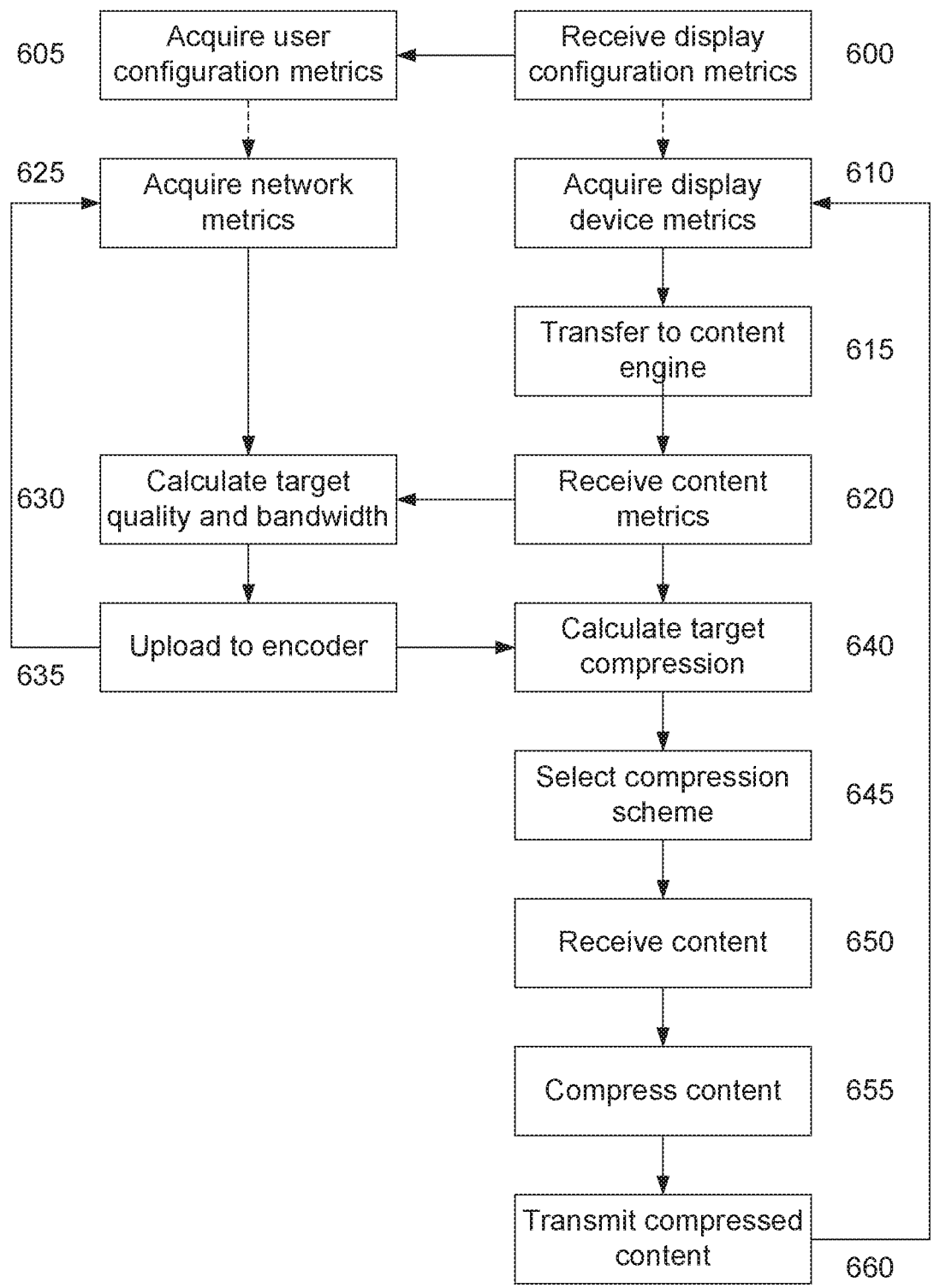
FIG. 6 is a flow chart of an example of a method of controlling content compression for transmission via a communications network.

An example of the operation of this system will now be described in more detail with reference to FIG. 6.

Initially, when a user joins a content session, such as a virtual reality gaming session or similar, the user will be allocated to a respective content engine 510 and encoder 520. At this time, the encoder 520 communicates with user's display device and/or associated decoder, receiving display configuration metrics, which are passed on to the controller 550. Whilst this happens, the controller 550 also acquires user configuration metrics, typically either retrieving these from a database, and/or receiving these from a supplier, such as a telecommunications company, internet service provider, or similar.

After the initial set-up has been performed, operation of the system to provide content commences. In this regard, at step 610, the encoder 520 receives display device status metrics from the decoder, which are indicative of user inputs and/or a display device movement/pose or other similar information. The display device status metrics are passed on to the content engine 510 at step 615, allowing the content engine to commence generating content, and in particular generating a next image frame. Whilst generating the content, the content engine can provide content metrics, which are typically indicative of the extent to which the content can be compressed, for example providing details of regions of the content that do not require encoding, details of the content quality, or the like. The content metrics are received by the encoder 520 at step 620, and passed on to the controller 550.

Whilst this process is occurring, the controller 550 acquires network metrics at step 625, with the network metrics, such as a node quality of service, available bandwidth, or similar. At step 630, the controller 550 calculates a target quality and bandwidth, based on the available metrics. The manner in which this is achieved will vary depending on the preferred implementation, but this is typically achieved using an optimization algorithm and/or machine learning technique.

At step 635, the target quality and bandwidth is uploaded to the encoder 520, allowing this to calculate a target compression at step 640. Specifically, this will take into account content metrics, such an expected content size, and display metrics, as well as the target quality and bandwidth, which are indicative of the extent to which the content can be compressed, allowing the compression to be calculated so that the resulting compressed content meets the bandwidth and quality requirements.

At step 645 the encoder 520 can select a compression scheme. In this regard, the encoder can be pre-programmed to utilize a range of different compression schemes and/or different compression parameters, with the scheme and/or parameters being selected based on a range of factors, such as the target compression, details of the display device configuration, attributes of the compression schemes, such as a compression time and/or quality, or the like. The compression algorithms can include standard known algorithms, and could involve adjusting compression for each image frame, as well as optionally being used in conjunction with variable frame rates, in order to allow a target bandwidth to be met without unduly effect image quality. In one specific example, custom algorithms can be used that are capable of dynamically adjusting compression of an image as the image is compressed, and an example of such an algorithm will be described in more detail below.

At step 650, the content is received from the content engine, with the content being compressed at step 655, and transmitted via the network 560 at step 660.

Figure 7A:
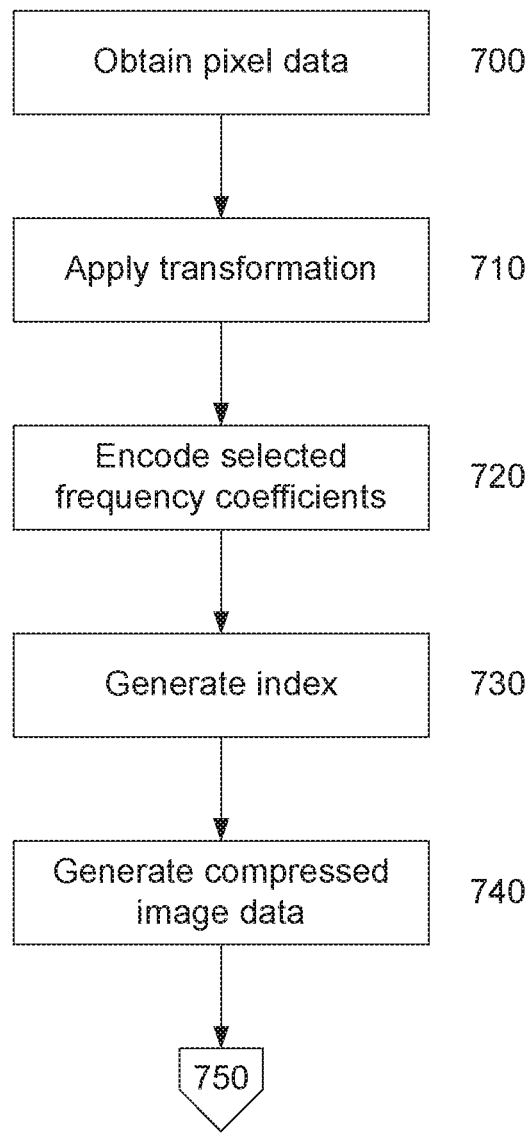
FIGS. 7A and 7B are a flow chart of an example of a method for compressing and subsequently decompressing image data.
Figure 7B:
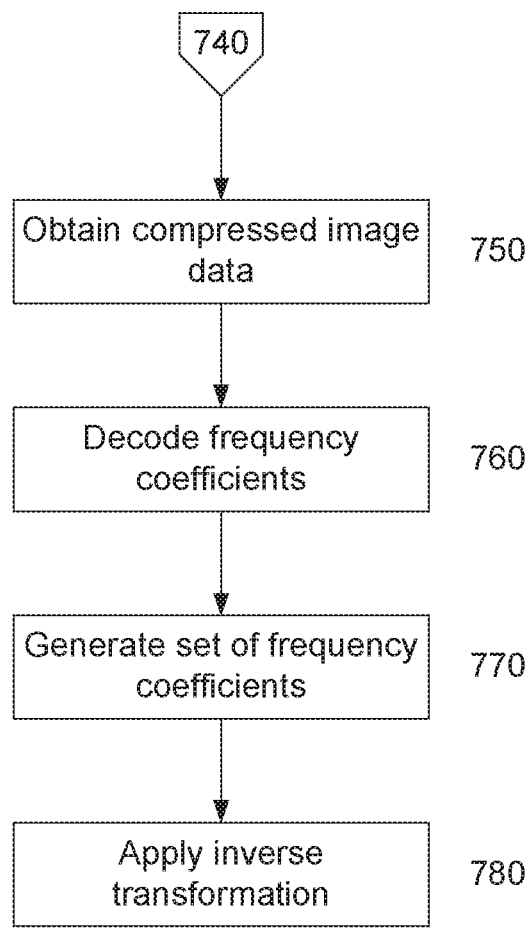

The above described process operates to dynamically adjust a target compression, allowing compression of content to be optimised for current network configurations. As mentioned above, the above described process can be used with any form of compression. However, in one example, when compressing image content, this can be used with an adaptive compression algorithm that is able to dynamically adjust the level of compression performed, and example of a suitable method for compressing and subsequently decompressing image data will now be described with reference to FIGS. 7A and 7B.

In this example, at step 700 pixel data is obtained from image data, with the pixel data representing a pixel array within the one or more images. The pixel data can be obtained in any appropriate manner, depending on the format of the image data. In one example, this is achieved simply by selecting a particular sequence of bytes from within the image data. The pixel array typically corresponds to a set number of pixels, such as an 8×8 block of pixels from within one of the images, although other arrays of pixels could be used.

At step 710, a transformation is applied to the pixel data to determine a set of frequency coefficients indicative of frequency components of the pixel array. The transformation is therefore typically a frequency transformation, such as a Fourier transform, or the like and in one example is a 2D DCT (Discrete Cosine Transform). The transformation could be applied in any suitable manner, for example using known transformation techniques, but in one example is performed in a highly parallel manner, thereby reducing the processing time.

At step 720, a selected subset of the set of frequency coefficients are encoded. In this regard, the frequency coefficients that are encoded are a subset that is selected so as to maximise the effectiveness of the frequency information that is encoded, for example by selecting the frequency coefficients having the highest magnitude and which therefore contribute most to the quality of decompressed images. The manner in which the selection is performed will vary depending on the preferred implementation, but in one example this involves selecting frequency coefficients having progressively smaller magnitudes, and hence can be defined by progressively smaller numbers of bits, until some limit is reached. In this regard, it will be appreciated that the level of compression achieved will depend on the number of frequency coefficients that are encoded, and so in one example, the level of compression can be controlled by controlling the size and/or number of frequency coefficients that are encoded.

However, this is not essential and other selection approaches can be used. The frequency coefficients can be encoded in any suitable way, which can vary depending on the preferred implementation, and in one example, could include using the original bit representation of the frequency coefficient, or performing some other form of lossless encoding, as will be described in more detail below.

At step 730 an index is created which is indicative of the frequency coefficients that are encoded. The index is used to identify the frequency coefficients so that these can be used to regenerate the image in a subsequent decompression step. This is required as different frequency coefficients will have different magnitudes for each pixel array, so that the frequency coefficients that are encoded will vary between each pixel array, and hence this information needs to be communicated to a decoder for use in decompression, and in particular to allow the decoder to reconstruct the set of frequency coefficients.

The index can be of any appropriate form and could identify the frequency coefficients in any appropriate manner, such as by identifying a location of the coefficients, for example within a coefficient matrix. The index may be provided separately to the frequency coefficients, for example by providing the index, followed by a string of encoded frequency coefficients or could include the encoded frequency coefficients within the index, as will be described in more detail below.

Once encoding has been performed and the index created, compressed image data can be generated at step 740, with the compressed image data including the encoded frequency coefficients and being provided together with the index. For example, this can be performed by creating a byte stream including sequences of the encoded frequency coefficients, optionally with additional information, so as flags or other markers, to identify the start of a new image, or the like.

Accordingly, the above described process allows compressed image data to be created by encoding selected frequency coefficients, and using an index in order to identify the frequency coefficients that have been encoded. By allowing the frequency coefficients to be selected arbitrarily, for example, based on their magnitude, this can result in a higher image quality when the image is subsequently decompressed.

In this regard, traditional approaches focus on encoding frequency coefficients corresponding to lower frequencies, on the basis that these typically contribute most to the image quality. In this instance, by encoding the same frequency coefficients each time encoding is performed, this facilities the decoding process, but conversely means the encoding performed is not optimised to each pixel array, leading to the artefacts such as banding.

In contrast, in the current approach, frequency coefficients can be selected to optimise the resulting image, for example by encoding the largest magnitude coefficients, which in turn provide the greatest contribution to the appearance of the resulting image. The largest magnitude frequency coefficients are not limited to those of the lowest frequencies, meaning that larger high frequency coefficients could also be encoded. In this instance decompression of the image is facilitated by the inclusion of the index in compressed image data, meaning the frequency coefficients selected can vary for each pixel block, allowing the compression to be optimised for each pixel block and/or image, whilst minimising the impact on image quality.

In this regard, at step 750 compressed image data is obtained, with the encoded frequency coefficients being decoded at step 760 to create a subset of frequency coefficients. It will be appreciated that the manner in which this is performed will vary depending on the nature of the encoding performed.

Following this, at step 770, the index is used to generate a full set of frequency coefficients, typically by defining un-encoded frequency coefficients with a null value. Following this an inverse transformation can be applied to the set of frequency coefficients at step 780 to determine pixel data representing a pixel array within the one or more images. In particular, this is typically in the form of an inverse frequency transformation, such as an inverse Fourier transform, 2D DCT, or the like.

Accordingly, the above described process allows image data to be encoded by encoding a selected subset of frequency coefficients and identify the encoded frequency coefficients using an index, which can then be used when decompressing the encoded frequency coefficients. This approach is inherently adaptive, meaning the frequency coefficients selected will vary depending on the content of the pixel array being encoded, thereby ensuring the compression is optimised for the content, allowing this to maximise the amount of compression that can be achieved, whilst minimising the impact on image quality.

In addition to the above described advantages, the scheme can be implemented in a highly parallel manner, which in turn enables the process to be performed rapidly, thereby reducing latency, which is important in many applications, such as virtual reality applications, in which images are created in response to movement of a display device and must be transmitted rapidly to the display device for display.

A number of further features will now be described.

In one example, the method includes selecting frequency coefficients having n bits, where n is an integer initially set to a maximum number of bits and then selecting frequency coefficients having progressively decreasing values of n bits. This is performed to encode frequency coefficients having a bigger magnitude, and hence a larger number of bits, in preference to those having a smaller magnitude and hence smaller number of bits, which in turn have less impact on image quality.

Typically the process of selecting progressively smaller numbers of bits is performed until encoding parameters are met, and in particular to ensure the target compression is achieved. Thus, in one example, frequency coefficients are selected to achieve a target compression. For example, in the event that aggressive compression is required, this can be performed by encoding only a few high magnitude frequency coefficients, whereas if less aggressive compression is required, this could involve encoding a greater number of coefficients.

As mentioned above, the target compression and hence the frequency coefficients selected can be determined taking into account a range of different factors. This can include using the display metrics, display configuration metrics, content metrics, or the like, thereby ensuring the degree of compression meets the target bandwidth.

The display metrics can define a current display device pose and/or movement, which can be used to assess redundancy compared to previous images, or a physiological attribute, such as a user gaze which can assess which areas of the image are being focused on by the user, and hence which require greater image quality and less compression. Similarly, the content metrics can be used to determine areas of interest within the image, for example based on visual content, and/or other contextual cues, such as audible cues, again allowing areas requiring greater image quality to be ascertained.

The display device configuration metrics typically define parts of the image that are either out of the field of view of the display device, and hence not displayed, and/or are in region of the image that is not displayed as well, and hence can use more aggressive compression without a perceived reduction in image quality.

Finally, the target bandwidth can be used to control an overall target compression used, based on current bandwidth and/or latency, ensuring the compressed image data can be transmitted in a timely fashion.

Thus, the method can include using the above metrics to select the target compression, which in turn can be used to allow the frequency coefficients that are encoded to be selected.

Furthermore, these arrangements can be used to adjust the degree of compression dynamically, and specifically can be used to adjust the compression for each pixel array. For example, the relative quality of some parts of an image may not be as important as other parts. In the case of virtual reality, peripheral parts of an image are often not actually displayed to a user due to image distortion of the display lenses. Consequently, such parts of the image could be encoded with an effective zero quality, thereby vastly reducing the amount of compressed image data without any loss in image quality of the viewable image.

Similarly, in a virtual reality application, analysis can be performed of which part of an image an observer is viewing, for example using eye tracking technologies or similar, and then encoding parts of the image nearer the point of gaze with a higher quality. In this regard, an observer's perception in peripheral regions will typically be reduced, so that a reduction in image quality is typically less noticeable. Consequently, by encoding the image with a higher quality nearer the observer's point of gaze, this allows an image with an overall lesser quality to be perceived by the observer as having an equivalent quality. In this regard, it will be appreciated that as long as transmission time for the whole image is maintained, it doesn't matter if pixel arrays near the centre of view contain more bits and take longer to transmit, as this can be accommodated by reducing the number of bits transmitted near peripheries of the image.

Thus, in one example, the method includes differentially compressing the image data so that different parts of the image are compressed using a different degree of compression, which in turn allows the overall degree of compression to be maximised without a perceived reduction in image quality. This allows different part of an image to be differentially compressed, whilst still meeting the target compression for the overall image.

In one example, the process is achieved by determining a position of the pixel array within the one or more images and then selecting the subset of frequency coefficients is selected based on the position, so that the extent to which the pixel data is compressed depends on the determined position of the pixel array.

The index is typically indicative of a number of bits of each encoded frequency coefficient and a location of the frequency coefficient either in a defined sequence or within the coefficient matrix. For example, the index could identify the frequency coefficient based on a coordinate position within the matrix, or simply based on a relative position in an ordered list of coefficients or a zig-zag traversal of a coefficient matrix. By identifying the frequency coefficient based on a location, this minimises the number of bits required to identify the coefficient, whilst ensuring this can be correctly identified upon decoding.

In this case, the number of bits could be specified once for multiple frequency coefficients, allowing the index to be constructed iteratively, for example by specifying a number of bits n, and then listing a location for each of the encoded frequency coefficients having that specified number of bits n. This would then be repeated for progressively decreasing numbers of bits n, until the index is complete, for example when the encoding parameters are met. It will also be appreciated that an index could be constructed for all frequency coefficients, with only some of these then being encoded and provided with a corresponding part of the index as part of the compressed image data.

Whilst the index can specify the above information each time it is transferred, it will be appreciated that some indexes might be repeated, for example if particular pixel arrays in an image are substantially identical. In this instance, the index could be substituted for a code, for example referring to the index of a previous pixel block, in which case the method can include determining an index code indicative of the index and generating the compressed image data using the index code.

In one example, the index is indicative of a value for each frequency coefficient, although this is not essential, and alternatively the index can be stored separately from the encoded frequency coefficients, for example by providing these as part of separate data structures.

The frequency coefficients can be encoded in any appropriate manner, and this could include encoding the frequency coefficient as the original bit sequence (i.e. without change), encoding the frequency coefficients without scaling and/or without lossy encoding. In one particular example, as the number of bits required to encode the value are known, then the first bit must be a "1" value (it being inherent that if it were "0" a smaller number of bits could be used), meaning this can value be omitted, so that frequency coefficients having n bits, are encoded using n−1 bits by removing a first bit.

However, it will be appreciated that other forms of encoding could be used, such as using a bit encoding scheme in which some of the encoded frequency coefficients have a reduced number of bits. This could be achieved, for example by scaling and/or omitting greater numbers of bits.

Thus, applying a scaling factor to at least some of the frequency coefficients can be used to reduce the frequency coefficient magnitude and hence the number of bits to be encoded. A similar scaling factor can then be applied when decompression is performed, thereby scaling the respective frequency coefficients back to their original magnitude. During this process, rounding is typically performed so that the scaled frequency coefficient is an integer value, or has a limited number of significant figures, thereby minimising the number of bits used to encode the coefficients. It will be appreciated that when this is performed, there is a resulting reduction in accuracy of the recreated frequency coefficients, but that the effect of this on the resulting image quality is negligible.

Additionally, a smaller number of bits can be used to encode frequency coefficients having a smaller magnitude, for example by simply reducing the number of bits used. Whilst this again results in a reduction of accuracy, this is minimal when compared to the accuracy obtain by ensuring the higher magnitude frequency coefficients are accurately encoded.

It will also be appreciated that different encoding schemes, defining different encoding parameters for selecting frequency coefficients and/or different scaling factors, could be used for different pixel arrays. In this situation, the encoder typically selects one of a plurality of encoding schemes and encodes the pixel data using the selected encoding scheme. This allows different encoding schemes to be selected based on factors, such as the target compression. So, for example, some pixel arrays could be encoded without scaling, whereas others might use scaling for any frequency coefficients having less than 5 bits. Again, the encoding scheme used could be specified as part of the index to facilitate decoding.

In one example, the image data defines a plurality of channels, with the method including selectively encoding frequency coefficients for each channel. By encoding different channels individually, this allows different channels to be encoded differently, for example using different bit encoding schemes, or discarding different frequency coefficients. Additionally, encoding channels independently allows channels to be encoded in parallel, which can significantly assist in reducing the time taken to perform encoding and hence reduce encoding latency.

In one example, the pixel data defines RGB channels, and the method includes converting the RGB channels into luminance and chrominance channels YCbCr and transforming the YCbCr channels. In this regard, luminance and chrominance channels are perceived differently by the human eye, allowing chrominance channels to be encoded using a greater degree of compression and hence a reduce quality compared to the luminance channel, without a resulting loss in perceived quality. Thus, in this example, the method can include selectively encoding more frequency coefficients for the Y channel than the Cb or Cr channels, and similarly can include selectively encoding frequency coefficients for the Y channel with more bits than for the Cb and Cr channels.

In a further example, where the pixel data defines RGB channels, the method can includes converting the RGB channels into YCbCr channels and generating the compressed image data by encoding the CbCr channels and using the Y channel. This, in effect in this example, the Y channel is effectively unencoded, meaning the entire information contained within the luminance channel is retained. This can be particularly useful in some encoding scenarios, for example when encoding pixel arrays showing a gradient, as this can help preserve the colour variations and hence improve image quality, whilst resulting in only a minor decrease in compression.

In general, when converting the RGB channels into YCbCr channels, and additionally when subsequently transforming the YCbCr channels to generate respective frequency coefficients, the converting and transforming steps are performed using a minimum bit size. Specifically, each coefficient is encoded using a number of bits higher than the original native number of bits, so that there is no loss of detail during the step of calculating the frequency coefficients. For example, 8 bit RGB coefficients could be treated as 10 bit coefficients when converting to YCbCr and then subsequently calculating frequency coefficients, to avoid a loss of information during this process. It will be appreciated as the frequency coefficients are subsequently encoded and/or scaled this will not increase the overall magnitude of the compressed data, but avoids loss of information when encoding, and hence can result in improved image quality and particularly reduced banding.

However, it will be appreciated that this is not essential and processing could alternatively be performed in the RGB channels, in which case colour conversion is not necessarily required. This also typically avoids a loss of precision and results in improved image quality.

As mentioned above, the different channels can be encoded in parallel. In this case, the method of generating compressed image data typically includes performing parallel to serial byte encoding, so that the frequency coefficients are serialised into a byte stream, which can then undergo byte encoding.

In this regard, byte encoding can be used to provide an additional lossless compression step. This typically involves code substitution, which is performed by parsing a sequence of bytes forming part of the compressed image data, identifying a sub-sequence including a number of identical bytes and substituting the sub-sequence for a code indicative of a value of the identical bytes and a number of identical bytes in the sub-sequence. In one example, when sub-sequence of identical bytes includes three or more bytes, the code includes two bytes, although it will be appreciated that other suitable coding schemes could be used.

Whilst such code substitution, often referred to as run length encoding, could be performed on any sequence of bytes, in one example, the sequence of bytes is the bit stream formed from the encoded frequency coefficients. In this regard, it is typical for many of the encoded frequency coefficients to have a zero value, meaning that when the bit stream formed from the encoded frequency coefficients is analysed as a sequence of bytes, it is frequent for there to be multiple zero value bytes in sequence. Accordingly, by substituting these for a code, this allows the number of bytes to be reduced.

Whilst the image data can be obtained from any source, in one example, the method includes obtaining the pixel data from a video feed, such as a sequence of images for display. In another example, the method is used as part of a digital reality system, and in one particular example for wirelessly transmitting digital reality content, such as augmented reality, virtual reality, mixed reality, telepresence, or the like.

In one example, the above described compression scheme is implemented in order to perform dynamic compression of individual pixel arrays based on a target compression. In particular, in this example the target compression, together with information regarding the degree of compression achieved for previous pixel arrays is used to determine a degree of compression that should be used for one or more future pixel arrays. In particular, this is used to select a bit encoding scheme, which is then used to encode the frequency coefficients at least in part utilising the approach described above, so that frequency coefficients having a higher magnitude can be preferentially encoded, although this is not essential. In this case the index is then generated to be indicative of the selected bit encoding scheme, therefore allowing corresponding decoding to be performed.

In this approach, a different bit encoding scheme can be selected depending on the magnitude of the frequency coefficients and the target compression. This allows the compression to be dynamically adjusted for groups of one or more pixel arrays so that the pixel arrays in the group are optimally encoded, whilst ensuring a desired target compression is obtained across an entire image.

Further features of this approach will be described in more detail below.

In one example, the method can be used for displaying image data in a wearable digital reality headset by receiving the compressed image data from a computing device via a communication network. This could include transferring compressed images from a cloud based computing environment to a local device, such a headset mounted smart phone, allowing creation of images to be performed using cloud computing. Examples of suitable connections, include a hardwired gigabit internet, streaming to mobile phones, for example via mobile communications networks, such as 3G, 4G or 5G networks, transmitting via a wired connection to a tethered HMD, or via a wireless connection to an untethered HMD, or the like.

It will also be appreciated that the above described system can be used in order to facilitate decompression of compressed image data.

For example, the system can use an index of the form described above together with the decoded frequency coefficients to reconstruct a set of frequency coefficients, a defined sequence of frequency coefficients and/or a coefficient matrix. In one example, this process involves decoding each encoded frequency coefficients, determining the location of each frequency coefficient, adding the decoded frequency coefficient into the defined sequence or coefficient matrix and adding null values into empty locations in at least one of the defined sequence and coefficient matrix.

In one example, where the index has been transmitted as a code, the method includes determining an index code from the compressed image data and determining the index from the index code.

Typically the method includes decoding each encoded frequency coefficient without scaling and/or without lossy decoding, with the manner in which this is performed varying depending on the manner in which the frequency coefficient was encoded.

In one particular example, the frequency coefficients are encoded by simply omitting the first bit (as this is always set to a value of "1"), in which case the method includes, for encoded frequency coefficients having n−1 bits, creating a frequency coefficient using n bits by adding a first bit.

However, additionally and/or alternatively, a bit encoding scheme can be used based on the bit encoding scheme used when encoding the frequency coefficients. For example, this could include regenerating some missing frequency coefficients corresponding to smaller frequency coefficients, typically as null values, allowing a subsequent inverse transform to be applied, as will be described in more detail below. The method can also include applying a scaling factor to at least some of the frequency coefficients so that scaled frequency coefficients are transformed.

As previously described the image data typically defines a plurality of channels, with encoded frequency coefficients being selectively decoded for each channel independently. The channels typically include YCbCr channels, with the method including performing an inverse transform of the YCbCr channels and converting the transformed YCbCr channels into RGB channels. Typically, the inverse transformation is an inverse 2-D discrete cosine transformation, although other suitable transforms could be used. It will also be appreciated that if the Y channel has not been encoded, as described above, the method can include decoding the CbCr channels and then converting the decoded CbCr channels and the Y channel into RGB channels. As in the example of compressing the image data, the method typically includes generating more frequency coefficients for the Cb or Cr channels than the Y channel.

The method can also include decoding channels in parallel, in which case compressed image data can be at least partially decoded by serial to parallel byte decoding, effectively segmenting the incoming byte stream into individual bit encoded frequency coefficients, which are then decoded in parallel.

In the event that lossless encoding is also performed, the method typically includes identifying a code within a sequence of bytes and substituting the code for a subsequence including a number of identical bytes. In this case, the code is typically indicative of a value of the identical bytes and a number of identical bytes in the sub-sequence. Again, the sub-sequence typically includes three or more bytes and the code includes two bytes, although other suitable arrangements could be used. Typically this process is performed on the compressed image data, with this being used to generate the bit stream, which is then used in creating the encoded frequency coefficients.

The decompressed data may also undergo further processing, such as using a deblocking filter, which is used for smoothing the sharp edges which can form between macroblocks when block coding techniques or the like used. This in turn can allow an increased degree of compression to be used, whilst avoiding a corresponding reduction in image quality.

As previously described, compressing image is typically performed by an encoder, which typically includes an electronic encoder processing device that obtains pixel data from the image data, performs a frequency transformation, selectively encodes at least some of the frequency coefficients, generates an index indicative of the encoded frequency coefficients and generates compressed image data using the encoded frequency coefficients and the index.

Similarly decompressing the compressed image data can be performed using a decoder, which typically includes an electronic decoder processing device that obtains compressed image data, determines a set of encoded frequency coefficients from the compressed image data, performs bit decoding of the encoded frequency coefficients, generates a set of frequency coefficients using the subset of frequency coefficients and the index and applies an inverse transformation to the set of frequency coefficients to determine pixel data representing an pixel array within the one or more images.

Figure 8:
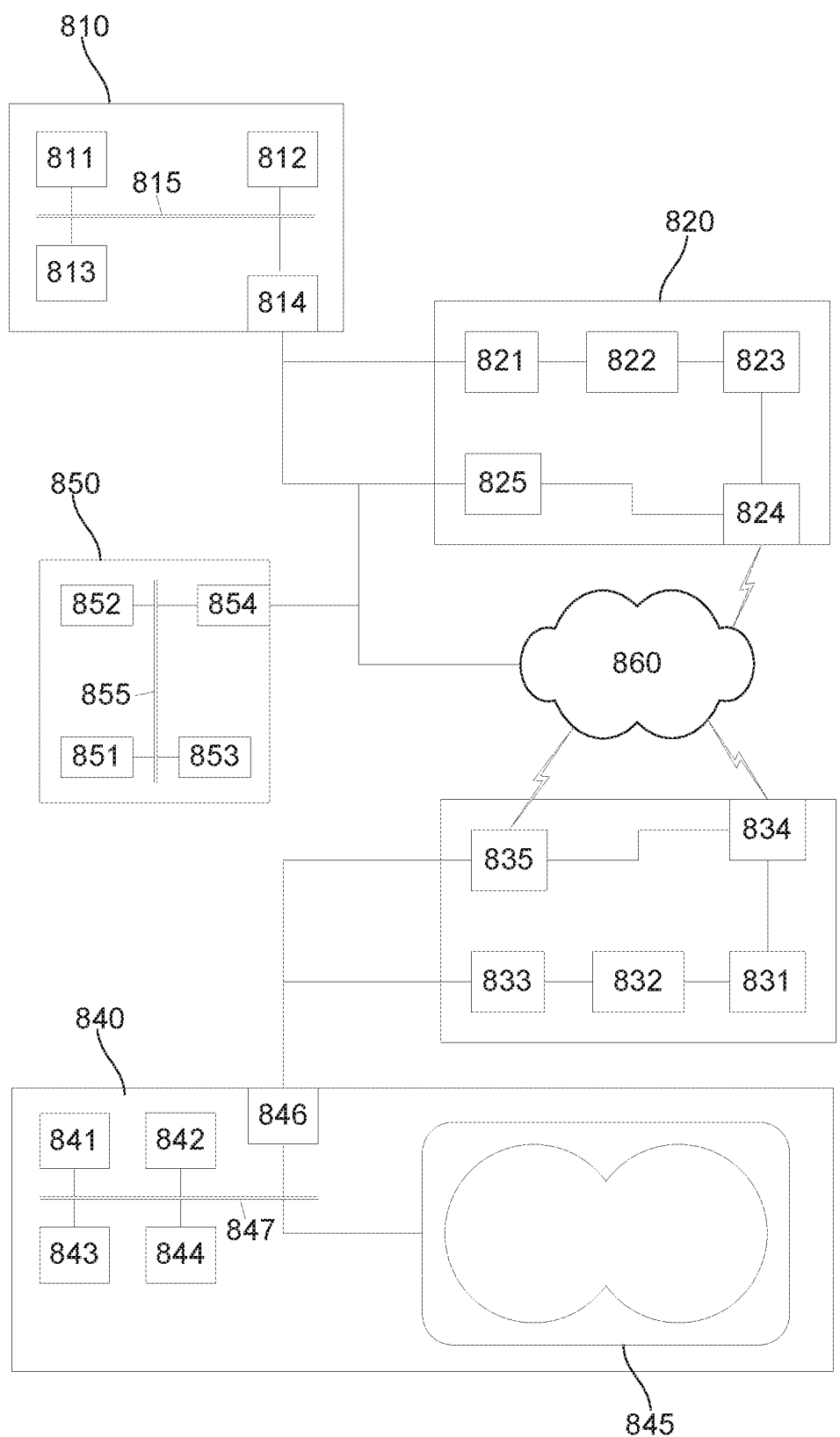
FIG. 8 is a schematic diagram of a specific example of a virtual reality system incorporating apparatus for compressing and decompressing image data.

An example of the hardware configuration will now be described in more detail with reference to FIG. 8.

This example will be illustrated with respect to a separate hardware encoder and decoder, but it will be appreciated that this is not essential and the same techniques could be used in conjunction with integrated hardware. Furthermore, whilst reference to made to virtual reality applications, again this is not essential and the techniques could be used to apply to any circumstance in which image data is to be transferred, and in particular when image data is to be transferred using a limited bandwidth, whilst maintaining an acceptable image quality and desired latency, such as in virtual reality, augmented reality or telepresence applications.

In this example, the apparatus 800 again includes a content engine 810, encoder 820, decoder 830 and a display device 840, in the form of an HMD or similar. A controller 850 for calculating a target bandwidth is also shown. Each of these components will now be described in more detail.

In this example, the content engine 810 includes at least one microprocessor 811, a memory 812, an optional input/output device 813, such as a keyboard and/or display, and an external interface 814, interconnected via a bus 815 as shown. The external interface 814 can be utilised for connecting the content engine 810 to peripheral devices, such as communications networks, storage devices, peripherals, or the like. Although a single external interface 814 is shown, this is for the purpose of example only, and in practice multiple interfaces using various methods (eg. Ethernet, serial, USB, wireless or the like) may be provided. In this particular example, the external interface includes at least a data connection, such as USB, and video connection, such as DisplayPort, HMDI, Thunderbolt, or the like.

In use, the microprocessor 811 executes instructions in the form of applications software stored in the memory 812 to allow the required processes to be performed. The applications software may include one or more software modules, and may be executed in a suitable execution environment, such as an operating system environment, or the like.

Accordingly, it will be appreciated that the content engine 810 may be formed from any suitable processing system, such as a suitably programmed PC, or the like. In one particular example, the content engine 810 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), an Application-Specific Integrated Circuit (ASIC), a system on a chip (SoC), a Graphics Processing Unit (GPU), Digital Signal Processing (DSP), or any other electronic device, system or arrangement.

Furthermore, whilst the content engine 810 is shown as a single entity, it will be appreciated that in practice the content engine 810 could be formed from multiple physical devices, which can optionally be distributed over a number of geographically separate locations, for example as part of a cloud based environment.

The encoder 820 typically includes an encoder input buffer 821, coupled in turn to an encoder processing device 822, an encoder output buffer 828, and a transceiver 824. A separate data buffer 825 can be provided coupled to the transceiver 824.

In use, image data, and in one particular example, video data is received and temporarily stored in the input buffer 821, before being passed to the encoder processing device 822 for compression. In this regard, the encoder input buffer typically buffers image data corresponding to a next m−1 rows of pixels of the image and a next m pixels of the next row of pixels, thereby obtaining pixel data for a next m×m block of pixels. Thus, it will be appreciated from this that the process does not require that an entire image is buffered, but rather only requires that m−1 rows of pixels and a further in pixels from the next row are buffered before processing starts. Once this has been done a next in pixels are buffered, with this being repeated until pixel data from the first in rows of pixels has been obtained and is being encoded. This process is then repeated for subsequent rows of pixels in the image, until pixel data is acquired for the entire image, at which point a next image is processed in a similar manner. The value of in is generally an integer and can be set depending on factors, such as selection rules, a required degree of compression, a position of the pixel array or the like. In one example m=8, in which case the process includes buffering seven rows of pixels of the image, and then a next eight pixels of the next row of pixels, so that the encoder processing device 822 obtains pixel data for a next 8×8 block of pixels from the buffered image data before it commences encoding.

As a result of this approach, the encoder input buffer need never store more than seven rows and eight pixels of image data, reducing memory requirements. Additionally, as pixel data is acquired, this can be immediately processed using the encoding process, even before the next eight pixels of image data are buffered. This has two major impacts, namely reduces processing times, in turn leading to significant reductions in latency, as well as reducing overall memory requirements.

The resulting compressed image data is then stored in the encoder output buffer 823, for example by sequentially reading in encoded bits, to thereby perform parallel to serial byte encoding, before being transferred to the decoder 830, via the transceiver 824. The transceiver 824 is also adapted to transfer other data, such as a sensor data received from the HMD 840, via the encoder data buffer 825.

The buffers 821, 823, 825 can be of any appropriate form of temporary storage, depending on the preferred implementation, and in one example can include high-performance FIFO (First-In-First-Out) field memory chips, or the like. The input buffer is typically connected to an HDMI port, display port output, or any other suitable video source, whilst the data buffer 835 is connected to a USB port, thereby allowing equivalent connection to the computer system.

The transceiver 824 can be of any appropriate form, but in one example allows for wireless communication via the network 860, such as a 5G network, or similar.

The processing device 822 can be any device capable of performing the compression process described herein. The processing device 822 could include a generic processing device operating in accordance with software instructions stored in memory. However, in one example, in order to ensure a suitably quick compression time, the processing device includes custom hardware configured to perform the compression process. This could include, firmware optionally associated with implementing logic such as an FPGA (Field Programmable Gate Array), a Graphics Processing Unit (GPU), an Application-Specific Integrated Circuit (ASIC), a system on a chip (SoC), digital signal processor (DSP), or any other electronic device, system or arrangement. In a preferred example, the encoder processing device 822 is configured to perform parallel processing of individual channels, of each DCT and parallel encoding of the individual frequency coefficients. Thus, whilst a single encoder processing device 822 is shown, in practice, a respective encoder processing device 822 could be provided for encoding each of the channels in parallel, or alternatively a GPU or other similar parallel processing architecture could be used. In the event that a channel, such as the Y channel, is not encoded, then the encoder processing device may simply introduce a delay in transmitting the respective data to the encoder output buffer 823, ensuring this is still synchronised with the encoded CbCr channels.

In the above described example, the encoder 820 and content engine 810 are described as discrete physical entities, but it will be appreciated that in practice this is not necessarily the case, and in one example the functionality of the encoder is implemented within hardware within the content engine 810, such as in a GPU or the like.

The decoder 830 typically includes a transceiver 834 coupled to a decoder input buffer 831, in turn coupled to a decoder processing device 832 and a decoder output buffer 833. A separate data buffer 835 can also be provided coupled to the transceiver 834.

In use, compressed image data is received from the encoder 820 via the transceiver 834, and temporarily stored in the input buffer 831, before being passed to the decoder processing device 832 for decompression. The resulting image data is then stored in the decoder output buffer 833, before being transferred to the display device 840. The transceiver 824 is also adapted to transfer other data, such as a sensor data received from the display device 840, via the decoder data buffer 835.

The buffers 831, 833, 835 can be of any appropriate form of temporary storage, depending on the preferred implementation, and in one example can include high-performance FIFO (First-In-First-Out) field memory chips, or the like. The output buffer is typically connected to an HDMI port, whilst the data buffer 835 is connected to a USB port, thereby allowing equivalent connection to the display device.

The transceiver 834 can be of any appropriate form, but in one example allows for communication via the network 860.

The processing device 832 could include a generic processing device operating in accordance with software instructions stored in memory. However, in one example, in order to ensure a suitably low decompression time, the processing device includes custom hardware configured to perform the decompression process. This could include, firmware optionally associated with implementing logic such as an FPGA (Field Programmable Gate Array), a Graphics Processing Unit (GPU), an Application-Specific Integrated Circuit (ASIC), a system on a chip (SoC), digital signal processor (DSP), or any other electronic device, system or arrangement. In a preferred example, the decoder processing device 832 is configured to perform parallel processing of individual channels, of each DCT and parallel encoding of the individual frequency coefficients. Again, whilst a single decoder processing device 832 is shown, in practice, a respective encoder processing device 832 could be provided for encoding each of the channels in parallel, or alternatively a GPU or other similar parallel processing architecture could be used. In the event that a channel, such as the Y channel, is not encoded, then the decoder processing device may simply introduce a delay in transmitting the respective data to the decoder output buffer 833, ensuring this is still synchronised with the CbCr channels.

The display device 840 includes at least one microprocessor 841, a memory 842, an optional input/output device 843, such as a keypad or input buttons, one or more sensors 844, a display 845, and an external interface 846, interconnected via a bus 847 as shown.

The display device 840 can be in the form of HMD, and is therefore provided in an appropriate housing, allowing this to be worn by the user, and including associated lenses, allowing the display to be viewed, as will be appreciated by persons skilled in the art.

In this example, the external interface 847 is adapted for normally connecting the display device to the content engine 810 via a wired connection. Although a single external interface 847 is shown, this is for the purpose of example only, and in practice multiple interfaces using various methods (eg. Ethernet, serial, USB, wireless or the like) may be provided. In this particular example, the external interface would typically include at least a data connection, such as USB, and video connection, such as DisplayPort, HMDI, Thunderbolt, or the like.

In use, the microprocessor 841 executes instructions in the form of applications software stored in the memory 842 to allow the required processes to be performed. The applications software may include one or more software modules, and may be executed in a suitable execution environment, such as an operating system environment, or the like. Accordingly, it will be appreciated that the processing device could be any electronic processing device such as a microprocessor, microchip processor, logic gate configuration, firmware optionally associated with implementing logic such as an FPGA (Field Programmable Gate Array), a Graphics Processing Unit (GPU), an Application-Specific Integrated Circuit (ASIC), a system on a chip (SoC), digital signal processor (DSP), or any other electronic device, system or arrangement.

The sensors 844 are generally used for sensing an orientation and/or position of the display device 840, and could include inertial sensors, accelerometers or the like. Additional sensors, such as light or proximity sensors could be provided to determine whether the display device is currently being worn, whilst eye tracking sensors could be used to provide an indication of a point of gaze of a user.

In the above described example, the decoder 830 and display device 840 are described as discrete physical entities, but it will be appreciated that in practice this is not necessarily the case, and in one example the functionality of the decoder can implemented within hardware within the display device 840.

In one example, the display device could therefore be an existing commercial display device, such as an HTC Vive™, Oculus Rift™ or Playstation VR™ headset, although it will be appreciated that this is not essential and any suitable arrangement could be used. For example, the display device could be in the form of a mobile phone or other similar display device incorporated into a wearable headset, with the digital reality content being generated and provided from a remote computer, such as a cloud based system, via one or more wireless networks.

The controller 850 includes at least one microprocessor 851, a memory 852, an optional input/output device 853, such as a keyboard and/or display, and an external interface 854, interconnected via a bus 855 as shown. The external interface 854 can be utilised for connecting the controller 850 to peripheral devices, such as communications networks, storage devices, peripherals, or the like, and typically allows the controller to be connected to at least the encoders 820 and network 860. Although a single external interface 854 is shown, this is for the purpose of example only, and in practice multiple interfaces using various methods (eg. Ethernet, serial, USB, wireless or the like) may be provided. In this particular example, the external interface includes at least a data connection, such as USB, and video connection, such as DisplayPort, HMDI, Thunderbolt, or the like.

In use, the microprocessor 851 executes instructions in the form of applications software stored in the memory 852 to allow the required processes to be performed. The applications software may include one or more software modules, and may be executed in a suitable execution environment, such as an operating system environment, or the like.

Accordingly, it will be appreciated that the controller 850 may be formed from any suitable processing system, such as a suitably programmed PC, or the like. In one particular example, the controller 850 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), an Application-Specific Integrated Circuit (ASIC), a system on a chip (SoC), a Graphics Processing Unit (GPU), Digital Signal Processing (DSP), or any other electronic device, system or arrangement.

An example of the operation of the image compression/decompression process will now be described in more detail.

For the purpose of this example, it is assumed that the content engine 810 is executing applications software that generates content that is displayed on the display device 840, with the content being displayed dynamically based on sensor data from sensors 845 onboard the display device 840, and optionally other sensors, such as handheld controllers or position detection systems (not shown), as will be appreciated by persons skilled in the art.

Actions performed by the content engine 810 being performed by the processor 811 in accordance with instructions stored as applications software in the memory 812 and/or input commands received from a user via the I/O device 813, or other peripherals (not shown). Actions performed by the display device 840 are performed by the processor 841 in accordance with instructions stored as applications software in the memory 842.

The encoder 820 and decoder 840 act as interfaces between the content engine 810 and display device 840, allowing image data to be compressed, transmitted wirelessly, and then decompressed before being displayed on the display device 840, whilst also allowing sensor data or other input command data to be transferred back to the content engine 810. Actions performed by the encoder 820 and decoder 830 are typically performed by the respective processing device 822, 832, based on defined programming, and in one example a custom hardware configuration and/or instructions in embedded firmware.

Similarly, the actions performed by the controller are performed by the processor 851 in accordance with instructions stored as applications software in the memory 852 and/or input commands received from a user via the I/O device 853, or other peripherals (not shown).

However, it will be appreciated that the above described configuration assumed for the purpose of the following examples is not essential, and numerous other configurations may be used.

Figure 9A:
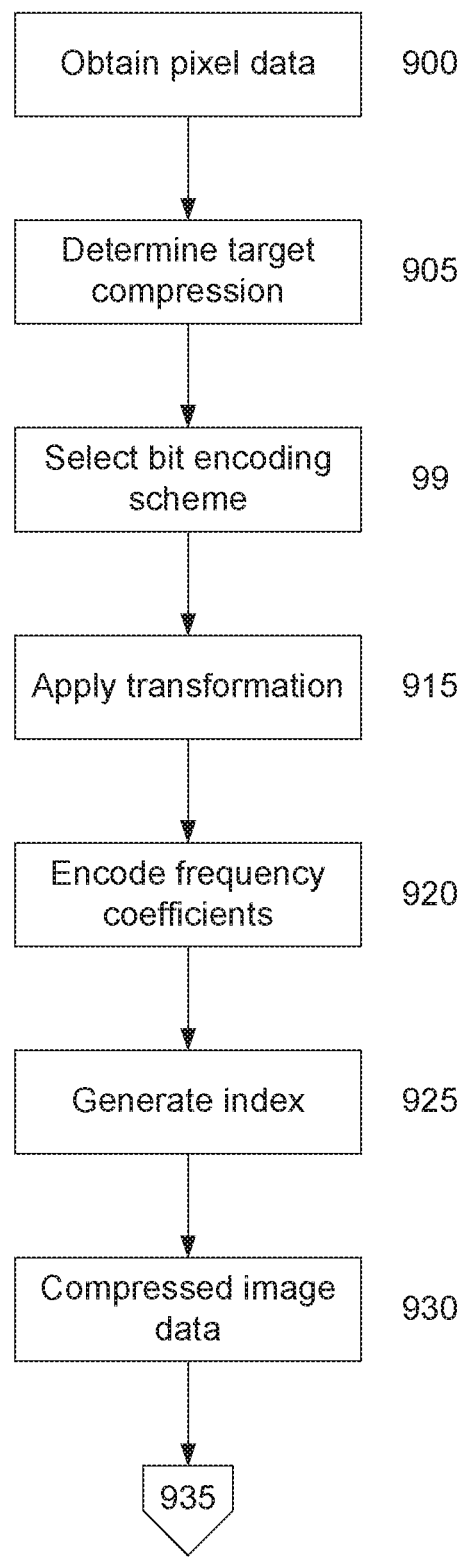
FIGS. 9A and 9B are a flowchart of a further example of a method for compressing and subsequently decompressing image data.
Figure 9B:
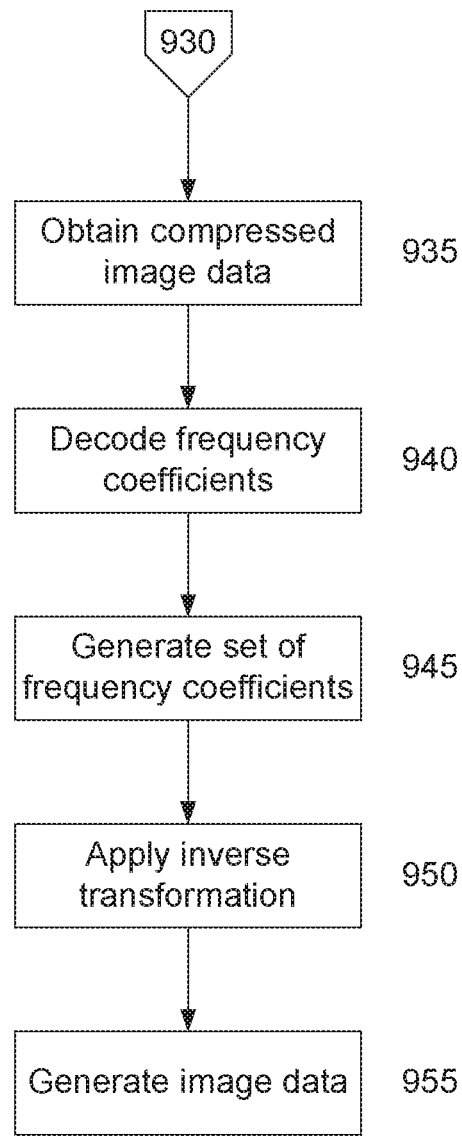
Figure 10A:
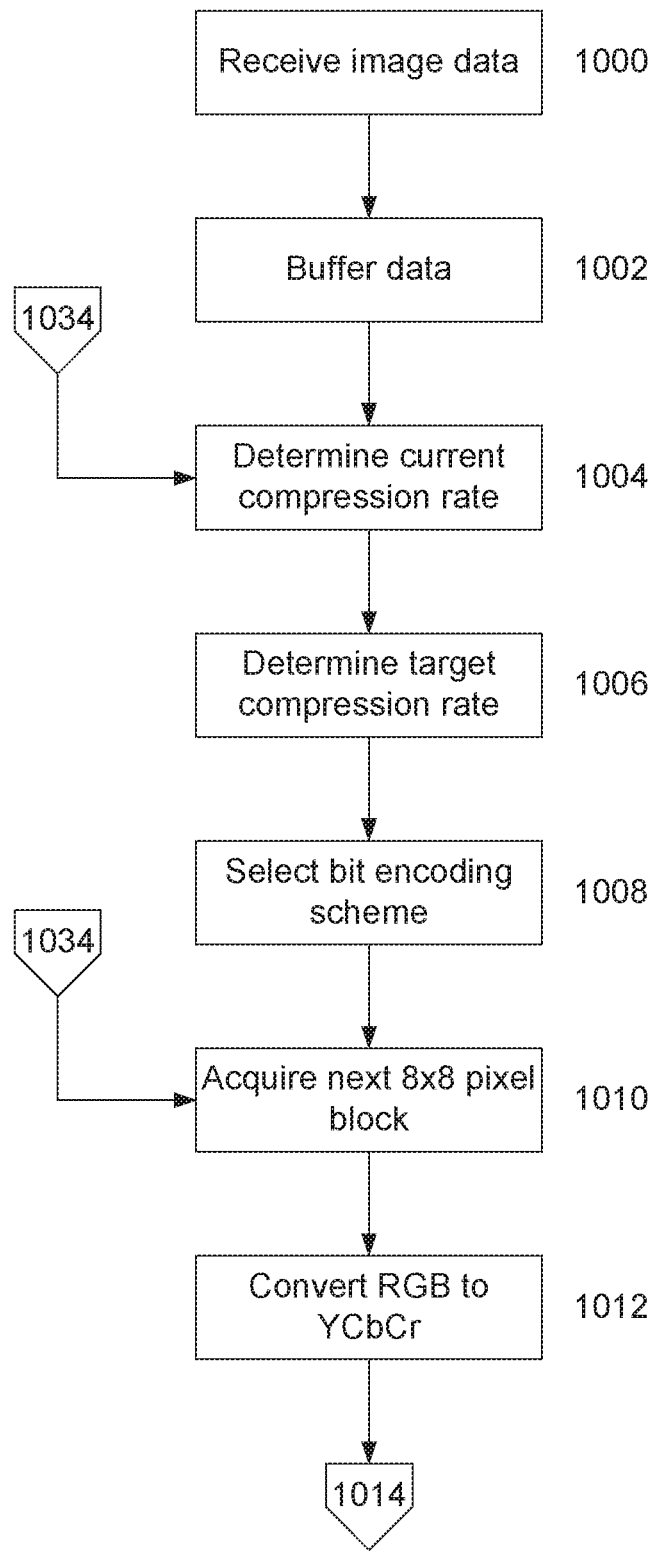
FIGS. 10A to 10D are a flowchart of a further specific example of a method for compressing and subsequently decompressing image data.
Figure 10B:
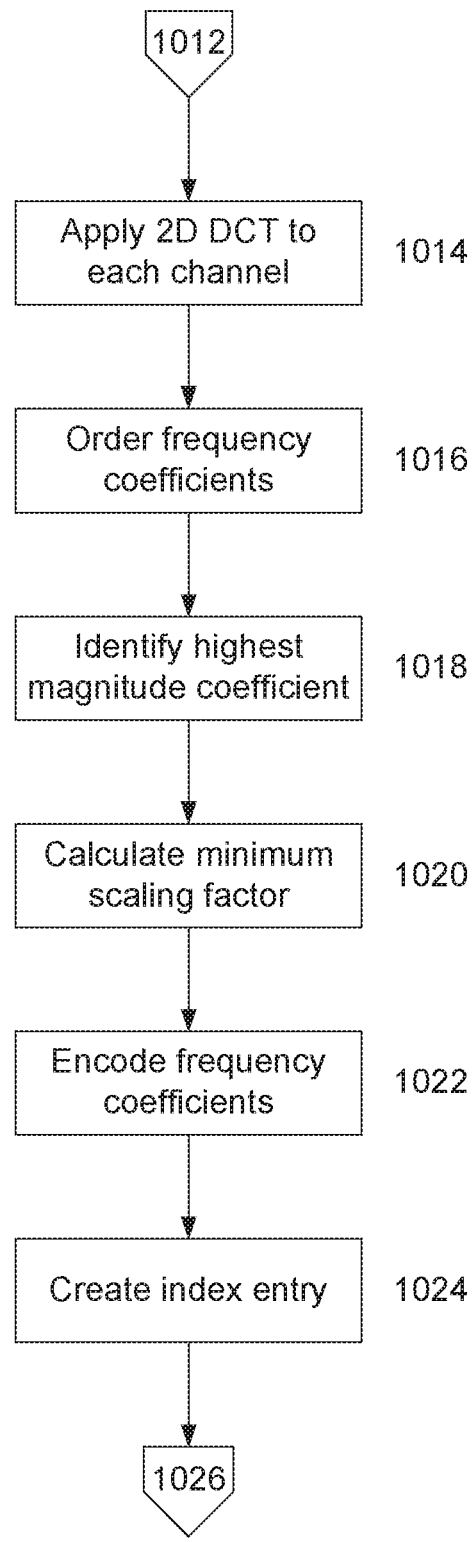
Figure 10C:
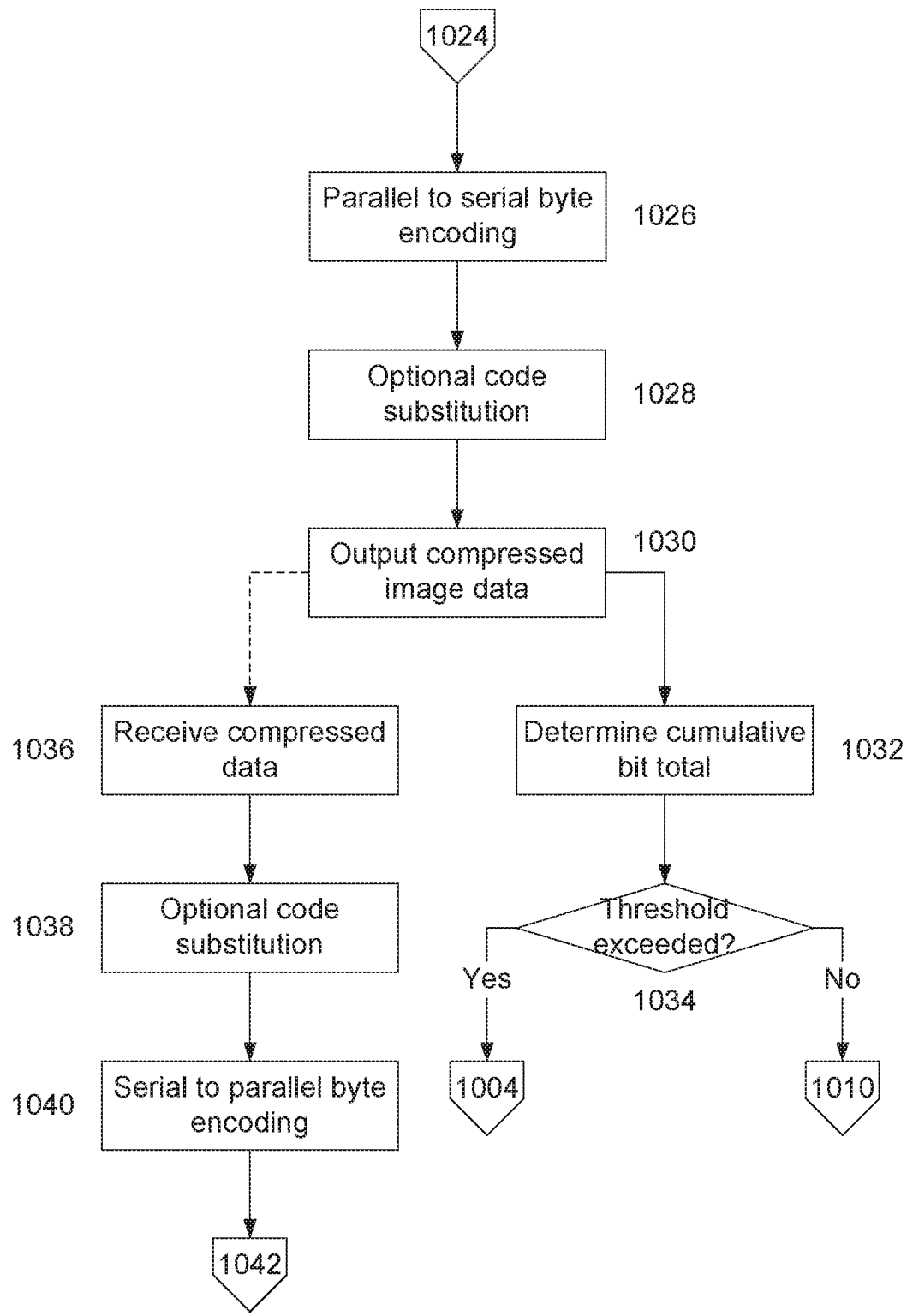
Figure 10D:
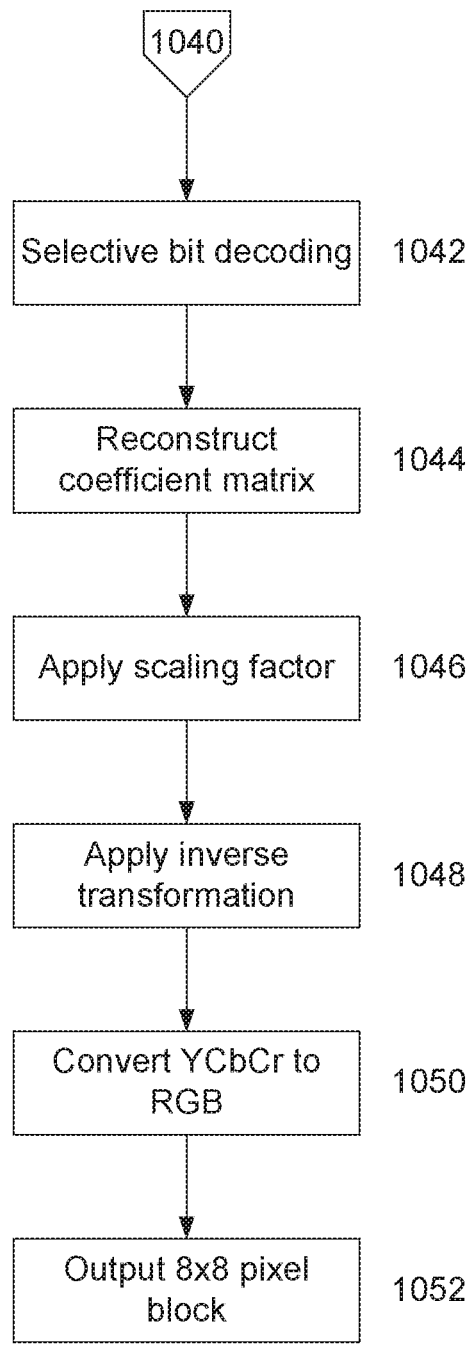

An example compression process so that a degree of compression is adjusted dynamically for each pixel block will now be described with reference to FIGS. 9A and 9B.

In this example, at step 900, the encoder 920 obtains pixel data from image data received from the content engine 810, with the pixel data typically representing a pixel array within the one or more images.

At step 905 a target compression is determined, with this being calculated based on a target bandwidth supplied by the controller 850. This is indicative of a degree of compression required and can be used together with information regarding compression of previous pixel blocks to select a bit encoding scheme at step 910, which can then be used to encode one or more pixel blocks, as will be described in more detail below.

At step 915 a transformation is applied to the pixel array to determine a set of frequency coefficients indicative of frequency components of the pixel array. This typically is achieved by performing a 2D DCT as previously described for example with respect to step 710.

At step 920 frequency coefficients are encoded. The frequency coefficients can be encoded so that a subset of a frequency coefficients are selected so as to maximise the effectiveness of the frequency information that is encoded, typically by selecting frequency coefficients having the highest magnitude. Additionally, and/or alternatively, encoding can be performed by scaling the frequency coefficients. In this regard, typically a number of the bit encoding schemes operate by performing both scaling and selective encoding of frequency coefficients. However, it will also be appreciated that depending on the degree of compression required, in some examples, the bit encoding schemes may only perform scaling of frequency coefficients, or may only perform encoding of selected frequency coefficients, depending on the preferred implementation.

At step 925, an index is generated which is at least partially indicative of the selected bit encoding scheme, and optionally the scaling factor, and/or frequency coefficients which have been selected and encoded.

At step 930 compressed image data is generated with this then being provided as required, for example by transmitting the compressed image data to a decoding system, which receives the compressed image data at step 935, and operates to decode frequency coefficients at step 940.

To achieve this, the decoder will determine the index from the compressed image data and use this to identify the bit encoding scheme that was used during compression. This then allows the decoder to generate a set of frequency coefficients, and optionally apply a scaling factor to descale the frequency coefficients if required at step 945. Following this an inverse 2D DCT transformation can be applied at step 950 with this being used to generate image data at step 955.

It will therefore be appreciated that the above described arrangement provides a mechanism in order to dynamically compress individual pixel arrays based on a target compression, so that pixel blocks can be differentially encoded based on one of a number of bit encoding schemes, which allow one or more of frequency coefficient scaling, or selective frequency coefficient encoding to be performed, so as to maintain an overall target compression, whilst optimising resulting image quality.

A number of further features will now be described.

The bit encoding scheme can be selected in any one of a number of manners and typically this takes into account a cumulative bit total for a number of previous pixel arrays. In one particular example, this takes into account a cumulative bit total and a target degree of a compression or target bit rate for the image. Thus in this instance, a total number of bits for a set number of previous pixel arrays, such as 10, 50, 500, 1000, 5000, 10000, or the like, can be calculated, with compression for the current pixel array then being tailored to ensure an overall bit rate is maintained.

The compression obtained will depend on factors such as a position of the pixel array within one or more images, display metrics, display configuration metrics, or the like. It will be appreciated from this that this allows the compression for individual and/or groups of pixel arrays to be adjusted depending both on an overall target compression, as well as of factors such as the location of the pixel array within the image, available communications bandwidth, or the like, ensuring sufficient overall compression is achieved by optimising the compression used on each pixel array.

In one particular example, a cumulative bit total is determined for a number of previous pixel arrays, if the cumulative bit total exceeds a cumulative bit total threshold, a degree of compression is determined for the number of previous pixel arrays, with the bit encoding scheme being selected using the degree of compression and the target compression, although it will be appreciated that other approaches could be used.

Whilst the above described process can be performed solely by encoding the subset of frequency coefficients as previously described, additionally, and/or alternatively, this can be achieved by scaling frequency coefficients with a scaling factor. In one preferred example, both approaches are used in combination with frequency coefficients being scaled and then a selected subset of the scaled frequency coefficients being encoded, depending on the magnitude of the scaled coefficients.

In one particular example this approach involves identifying a highest magnitude frequency coefficient, calculating a minimum scaling factor required to reduce the highest magnitude frequency coefficient to a target number of bits and then scaling the frequency coefficients using either the minimum scaling factor, or a larger scaling factor. This can be used for example to ensure all frequency coefficients are reduced to a magnitude of seven bits or smaller, with the highest magnitude coefficients being selected to form the compressed image data, although it will be appreciated that the first coefficient in the coefficient matrix, which is typically referred to as the DC coefficient, can be excluded from this process, allowing the DC coefficient to be transmitted unscaled, for example as an eight, nine, ten or eleven bit number, depending on the preferred implementation. Retaining the DC component unscaled can significantly improve resulting image quality, for example by reducing the impact of banding.

In one particular example, the above process is achieved by selecting one of a number of bit encoding schemes with each bit encoding scheme defining available scaling factors and one or more bit thresholds. In this example, frequency coefficients are then scaled using one of the available scaling factors that is at least the minimum scaling factor, and then encoding the scaled frequency coefficients in accordance with the bit threshold, for example by only encoding frequency coefficients having more bits than the bit threshold and/or discarding scale frequency coefficients having less bits than the bit threshold.

Thus, it will be appreciated that in this example, the bit encoding schemes define a combination of a bit thresholds and scaling factors which can be used to achieve a different degree of compression. The bit encoding scheme used for any individual pixel array can then be selected based on the array target, which in turn depends on a cumulative bit total for a number of previous pixel arrays.

In one example, each bit encoding scheme defines a respective bit threshold for different colour channels, and in particular for luminance and chrominance channels. In general this includes a higher bit threshold for chrominance channels than the luminance channel so that more frequency coefficients are discarded for chrominance channels than the luminance channel. This helps preserve information within the image that is perceived by individuals viewing the image, thereby maintaining image quality. Additionally, as previously described, when converting colour channels and generating the frequency coefficients, the coefficients are generally processed using a higher level of precision, for example using 10 bits to encode an 8 bit coefficient, so that rounding inaccuracies are avoided.

Accordingly, in one example, the method includes applying a transformation to the pixel data, calculating the minimum scaling factor, selecting a bit encoding scheme, scaling the frequency coefficients and then encoding the subset of scaled frequency coefficients in accordance with the bit threshold for the respective colour channel.

In one preferred example, the approach involves selecting a bit encoding scheme from an ordered list bit encoding schemes, with the list being ordered to provide progressively increasing compression. This allows an initial bit encoding scheme selection to be made based on the required degree of compression, with the scheme selected being altered for different groups of blocks, depending on the compression required to meet the array target.

The progressive increase in compression is typically achieved by increasing the magnitude of the available scaling factors, reducing a lowest available scaling factor and progressively increasing bit thresholds. The scaling factors than can be used can be any one or more of one, two, four or eight, although it would be appreciated other factors could be selected as appropriate. Similarly the bit thresholds could be any one or more of one, two, three, four, five or six, although again other thresholds could be used depending on the particular implementation.

It will be appreciated that the above described technique can be performed utilising features and hardware similar to that described above with respective to FIGS. 1A to 10, and these features will not therefore be described in any further detail.

A more specific example of the coding approach will now be described with reference to FIGS. 10A to 10D, 11A to 11C and FIGS. 12A to 12E.

In this example, the encoder 820 receives image data representing one or more of a sequence of images, from the content engine 810, and temporarily stores this in the encoder input buffer 821 at steps 1000 and 1002. The image data is analysed, for example by parsing the data to identify flags within the data that delimit headers, identify the start of an image, or the like, allowing pixel data corresponding a next block of 8×8 pixels from the image data to be acquired at step 1004. In this regard, when buffering the data, the encoder requires an initial 8×8 block of pixels from the image in order to commence processing. Accordingly, the encoder input buffer 821 is populated with the first seven lines of pixels of an image, as well as the first eight pixels of the eighth line of pixels, before processing can commence. As the next eight pixels are received, the next 8×8 block can be processed, with this being repeated until all pixels in the first eight rows of the image have been processed. Following this a next group of eight rows can be processed in a similar manner.

Prior to acquiring the pixel array, at step 1004 a current degree of compression for a number of previous pixel arrays is optionally determined, with this being performed for example after a set number of pixel arrays have been encoded, or when a cumulative bit total, which is a total number of bits used to encode a number of previous pixel blocks, reaches a threshold, as will be described in more detail below.

At step 1006 a target compression is determined from the controller 850, which represents an average compression ratio that should be maintained for compression of the current image, or current part of an image.

At step 1008, a bit encoding scheme is selected. In particular, the next bit encoding scheme is selected from an ordered list, with the scheme being selected to provide more or less compression than a previously selected scheme, based on whether the current degree of compression is above or below the target compression. In this regard, the bit encoding scheme list typically includes a list of bit encoding schemes providing progressively higher compression such that schemes towards a top of the list have minimal scaling factor, whilst scaling factors increase for schemes later in the list. Accordingly, a next scheme can be selected by moving up or down the list as required.

An example of such a list is set out in Table 1 below. In this instance, assuming bit encoding scheme 8 or higher is selected, then a scaling parameter of 4 or 8 would be used in order to allow a desired scaling to be achieved.

TABLE 1

| Encoding Scheme | Bit Threshold | Scaling Factors |
|---|---|---|
| 1 | 0 | 1, 2, 4, 8 |
| 2 | 1 | 1, 2, 4, 8 |
| 3 | 2 | 1, 2, 4, 8 |
| 4 | 0 | 2, 4, 8 |
| 5 | 1 | 2, 4, 8 |
| 7 | 2 | 2, 4, 8 |
| 8 | 0 | 4, 8 |
| 9 | 1 | 4, 8 |

Once the bit encoding scheme is selected and the pixel array acquired, at step 1012 the RGB channels are converted to luminance and chrominance channels, with a 2D DCT being applied to each channel at step 1014, to thereby transform the channels into the frequency domain. This process can be performed using known techniques, and in a preferred example is performed by the processing device 822 in a highly parallel fashion to thereby reduce processing times. The result of the transformation process on each channel is an 8×8 matrix, having 64 frequency coefficients, representing the magnitude of different frequency coefficients in the respective image channel.

At step 1016 frequency coefficients within each coefficient matrix are ordered with this being used to identify a highest magnitude frequency coefficient at step 1018. A minimum scaling parameter is then determined at step 1020 by calculating the scaling factor required in order to reduce the magnitude of the highest magnitude coefficient to below a set number. In particular, in one preferred example this is achieved to reduce the magnitude of the highest magnitude coefficient to below 127 so that this can be encoded using seven bits. It will be appreciated however that alternative numbers as 63 or lower could be used depending upon the preferred implementation.

At step 1022 the frequency coefficients are encoded, by first scaling the frequency coefficients and then selecting the scaled frequency coefficients for encoding, with this being used to create an index entry at step 1024.

The manner in which the index entry is created will now be described with reference to FIGS. 11A to 11C.

Figures 11A, 11B:
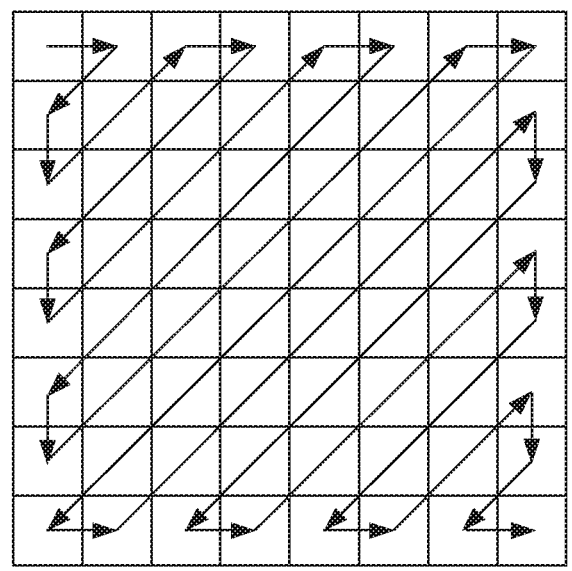
FIG. 11A is a schematic diagram of an example of a coefficient matrix.
FIG. 11B is a schematic diagram of an example of a traversal path of the coefficient matrix of FIG. 11A.
Figure 11C:
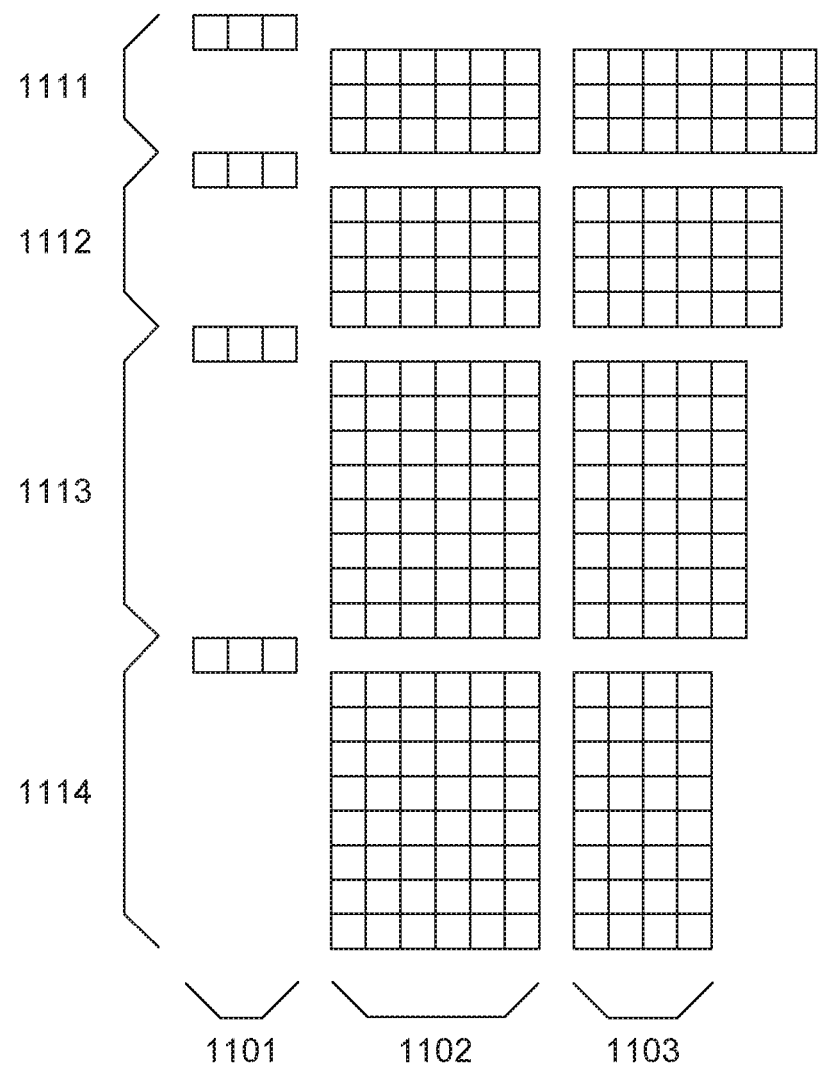
FIG. 11C is a schematic diagram of an example of a bit structure of an index for the coefficient matrix of FIG. 11A.

In the example of FIG. 11A a matrix is shown including a number of frequency coefficients having values that can be defined by different numbers of bits, including 0 to 8 bits, denoted by $C_0$ to $C_8$.

To create the index, the coefficient matrix is traversed, for example using the zig-zag traversal path shown in FIG. 11B, until a first 8 bit coefficient $C_8$ is reached. At this point, the location of the frequency coefficient is determined, either based on a number between 0 and 63, representing the distance traversed along the path, or using two values between 0 and 7 representing a row and column of the matrix. It will be appreciated that in each case, the location can be expressed using 6 bits, with an example of the index entry being shown schematically in FIG. 11C.

In this example, the index includes a column 1101 including entries defining a current number of bits n, a second column 1102 representing a location and a third column 1103 representing the value of the frequency coefficient. Whilst the value of the frequency coefficient is included in the index in this example, it will be appreciated that this is not essential, and alternatively the index and frequency values could be provided in separate data structures.

As part of this process, the frequency coefficient typically undergoes encoding. In this regard, the first frequency coefficient is shown with 7 bits, as the first bit can be omitted on the basis that this must be a value "1", otherwise the frequency coefficient would be a 7 bit value. It will also be appreciated however that other coding schemes could be employed to further reduce the number of bits, for example by scaling or the like, and these processes will not be described in further detail.

It will therefore be appreciated that using the above defined process, the coefficient matrix is recursively searched for successive decreasing values of the number of bits n until a limit is reached. The number of resulting bits for the index and frequency coefficients will depend on the actual values of the frequency coefficients, which will vary dramatically for different pixel arrays. Examples of the total number of bits required for different n threshold values are shown in Table 1 below. To encode 64 8-bit words would normally require 512 bits, so in this instance, it is apparent that as long as nothing smaller than 4 bit frequency coefficients are encoded then there will be a reduction in the number of bits that need to be encoded.

TABLE 2

| n Threshold | No. bits |
|---|---|
| 8 | 42 |
| 7 | 93 |
| 6 | 184 |
| 5 | 267 |
| 4 | 451 |
| 3 | 510 |
| 2 | 561 |
| 1 | 660 |

In practice, most coefficient matrices have a much greater number of frequency coefficient with small values, and hence reductions in the number of bits are far greater, meaning that in practice greater compression can be achieved. It will also be appreciated that the degree of compression obtained is relatively higher for when higher bit frequency coefficients, such as 10 or 12 bit magnitude frequency coefficients are present in the matrix, meaning benefits are generally greater for higher quality images.

Irrespective of the relative degree of compression obtained, a further important factor is that the most important frequency coefficients, and particularly those with the highest magnitude are retained, thereby minimising the impact on the resulting image quality.

In the above example, the indexing process is halted once the subset of frequency coefficients to be encoded has been identified. However, it will be appreciated that this is not essential, and alternatively the entire coefficient matrix could be traversed for all frequency coefficient magnitudes, effectively creating an index of all frequency coefficients. In this instance the thresholds could be applied after the index is created so that only a selected subset of frequency coefficients are incorporated into the compressed image data. It will be appreciated that this has the same end result, and this will not therefore be described in further detail.

Once the encoding has been performed, the index and the encoded subset of frequency coefficients can be concatenated into a bit stream at step 1026 by performing parallel to serial byte encoding, in particular by combining the index and frequency coefficients for each of the three channels.

At step 1028, additional encoding can be performed by parsing the bytes to identify sub-sequences of identical bytes, which are then substituted for a code so as to perform code substitution encoding. Specifically, this approach is used to identify sub-sequences of three or more identical bytes, which can then be substituted for a code without any loss of information. In particular, for most images there are strings of zeros in the resulting encoded frequency coefficients, where the scaled coefficients have rounded to zero. Accordingly, these can be substituted by a code, which can be identified by the decoder, allowing the decoder to reinsert the sub-sequence of identical bytes.

Whilst the code could of any suitable form, in one example the code includes a header identifying that the particular byte is a code, and information corresponding to the value of and number of identical bytes. In a preferred arrangement a 2 byte code is combined using a Boolean OR operation with the number of zeros in a row (1-8). In one example, the number of zeros is represented as N−1, so that the numbers of 0-7 are ORed with the 2 byte code so that these only take up 3 bits of the second byte. For example, the code used can be (1111 1111; 1111 1000) with the second byte OR'ed with 0-7 depending on the number of zeros. It will be appreciated that similar approaches could be used for different values.

This approach works well as the encoding rarely results in consecutive numbers greater than or equal in value to 248, so the decoding algorithm can simply search for one byte having a value of 255 and a subsequent byte having a value greater than or equal to 248, identifying this as a code as opposed to encoded frequency coefficients. This code is then replaced by bytes corresponding to the data with the number of a sequence of zeros represented by the last 3 bits of the second byte. This can lead to a further 19-25% reduction in data after the bit encoding stage based on testing to date.

Following this, compressed image data can be output at step 1030.

At step 1032, a cumulative bit total for a number of previous pixel arrays is determined, with this being used to assess whether a cumulative bit total threshold has been exceeded at step 1034. If not, the process returns to step 1010 to acquire a next pixel array. Otherwise the process returns to step 1004, to determine the compression rate and select a bit encoding scheme as described above. Thus, it will be appreciated from this that a new bit encoding scheme is selected after a certain number of compressed bits have been created. At this point, the cumulative compression ratio of those blocks is reviewed and the bit encoding re-selected allowing this to be changed if required, thereby ensuring the target compression is met, even if the target compression changes as a result of changing network requirements.

It will be appreciated that this allows a number of blocks to be encoded, with the bit encoding scheme being dynamically updated based on the total amount of compressed image data generated. Thus, for areas of the image where less compression is achieved, the bit encoding scheme may switch more rapidly, to help ensure that the scheme selected is optimised. In general, the cumulative bit total threshold is selected so that the bit encoding scheme changes several times within the size of a wireless packet, to control the bit rate that will be sent through the wireless system and ensure there are no peaks or great variations of compression ratios.

However, alternatively the bit encoding scheme could be reselected after a set number of blocks have been processed. This could include single blocks, although the system would typically be less stable and so typically a greater number of blocks would be used.

At step 1036 compressed image data is received by the decoder 830, storing this in the decoder input buffer 831. The data is parsed at to identify codes within the data, as described above, with these being substituted with sub-sequences of repeated identical bytes at step 1038, before serial to parallel byte encoding is performed at step 1040 in order to reconstruct the index and frequency coefficients for each of the three colour channels.

At step 1042, selective bit decoding is performed, specifically to decode each of the encoded frequency coefficients. It will be appreciated that in its simplest form this simply involves adding a "1" bit to the start of each of the encoded frequency coefficients. The decoded frequency coefficients are then inserted into a frequency coefficient matrix based on the location identified in the index. For any empty spaces in the matrix these are then populated by null values, thereby reconstructing the coefficient matrix at step 1046. Scaling can be applied at step 1046, before an inverse transform can be applied to the frequency coefficients at step 1048, with the chrominance and luminance channels being converted to RGB channels at step 1050, and an 8×8 pixel block being output at step 1052.

Example results of this approach are shown in FIGS. 12A to 12H.

Figure 12A:
FIG. 12A is an example of a compressed image.

In particular, FIG. 12A shows an example image including two image regions 1201, 1202, in the form of bands extending across the image.

Figure 12B:
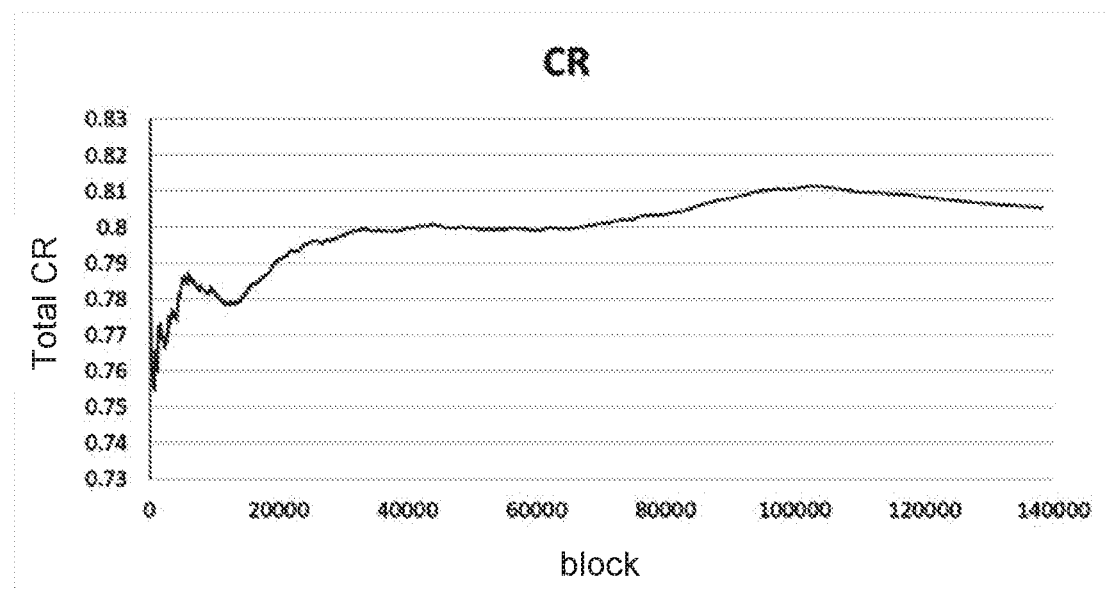
FIG. 12B is a graph illustrating an overall compression rate for compression of the image of FIG. 12A.
Figure 12C:
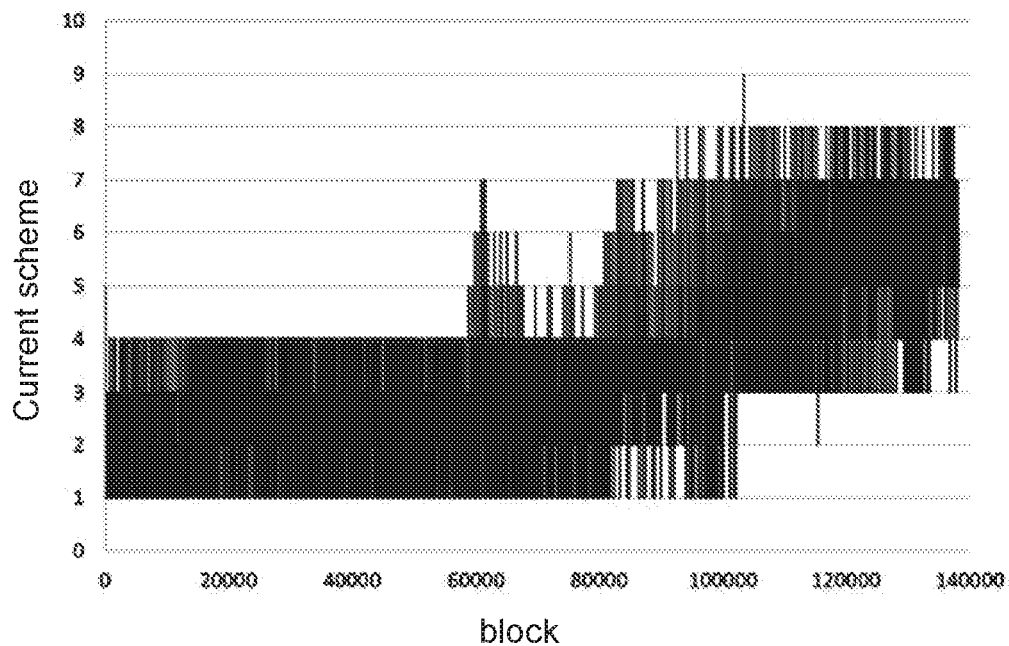
FIGS. 12C and 12D are graphs illustrating a selected bit encoding scheme and corresponding compression rate for compression of pixel blocks of the image of FIG. 12A.
Figure 12D:
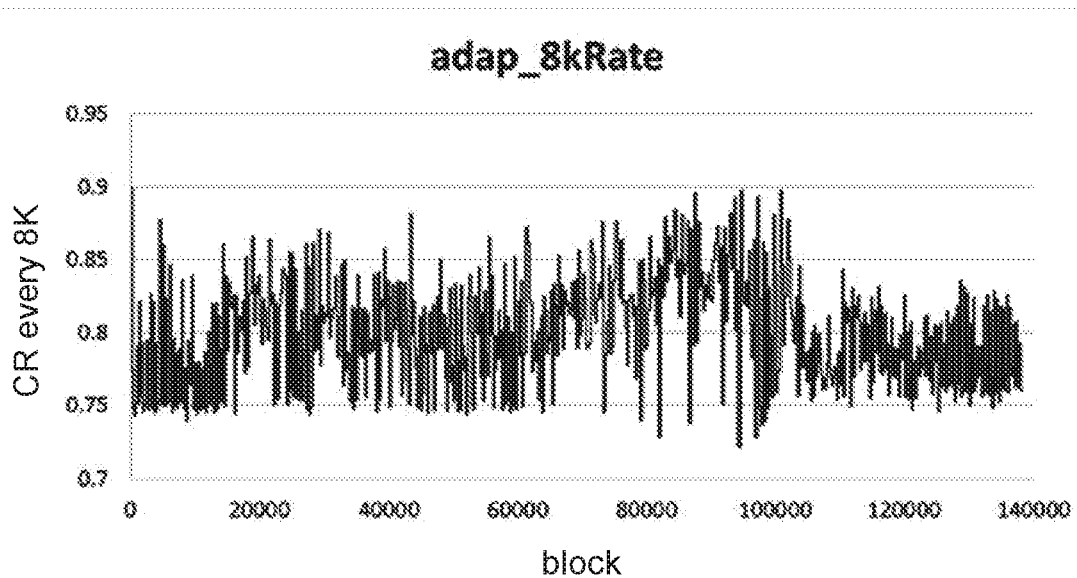
Figure 12E:
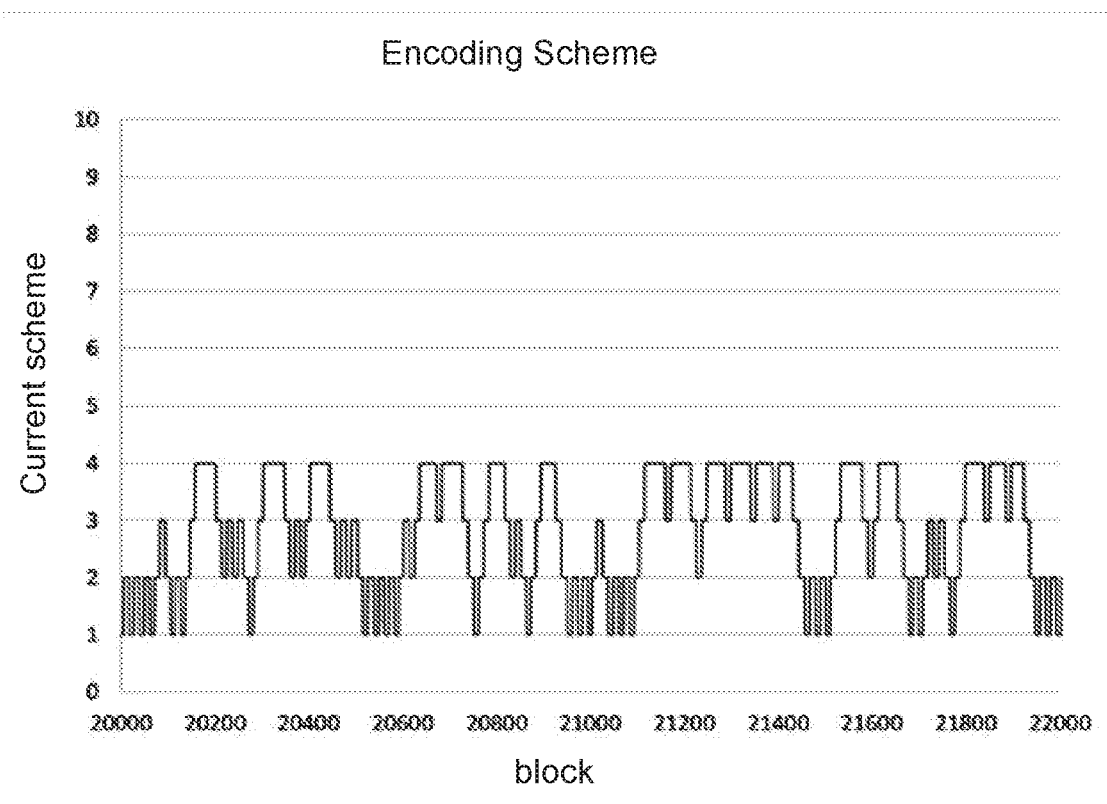
FIGS. 12E and 12F are graphs illustrating a selected bit encoding scheme and corresponding compression rate for compression of pixel blocks for a first portion of the image at FIG. 12A; and, FIGS. 12G and 12H are graphs illustrating a selected bit encoding scheme and corresponding compression rate for compression of pixel blocks for a second portion of the image of FIG. 12A.
Figure 12F:
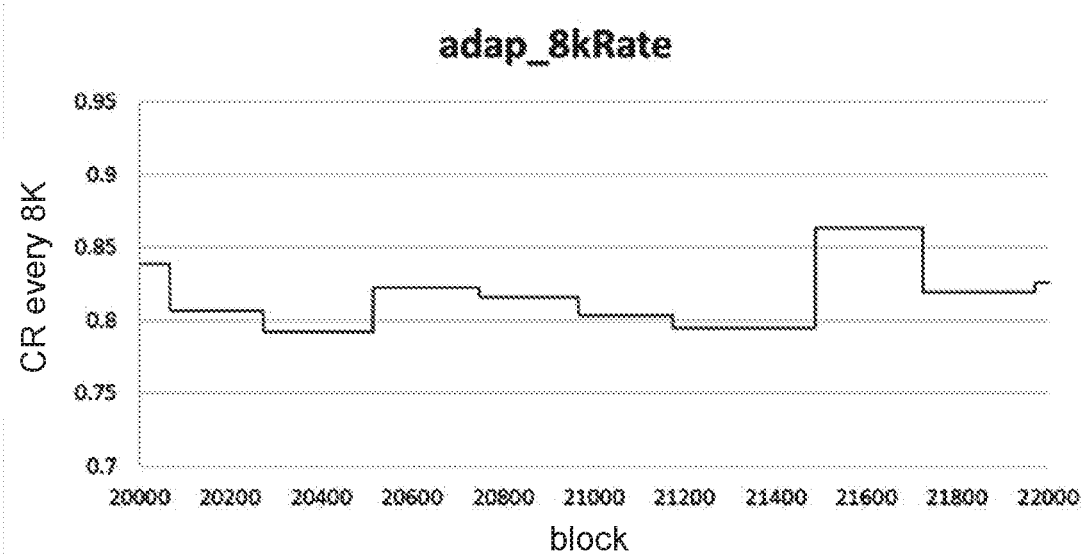
Figure 12G:
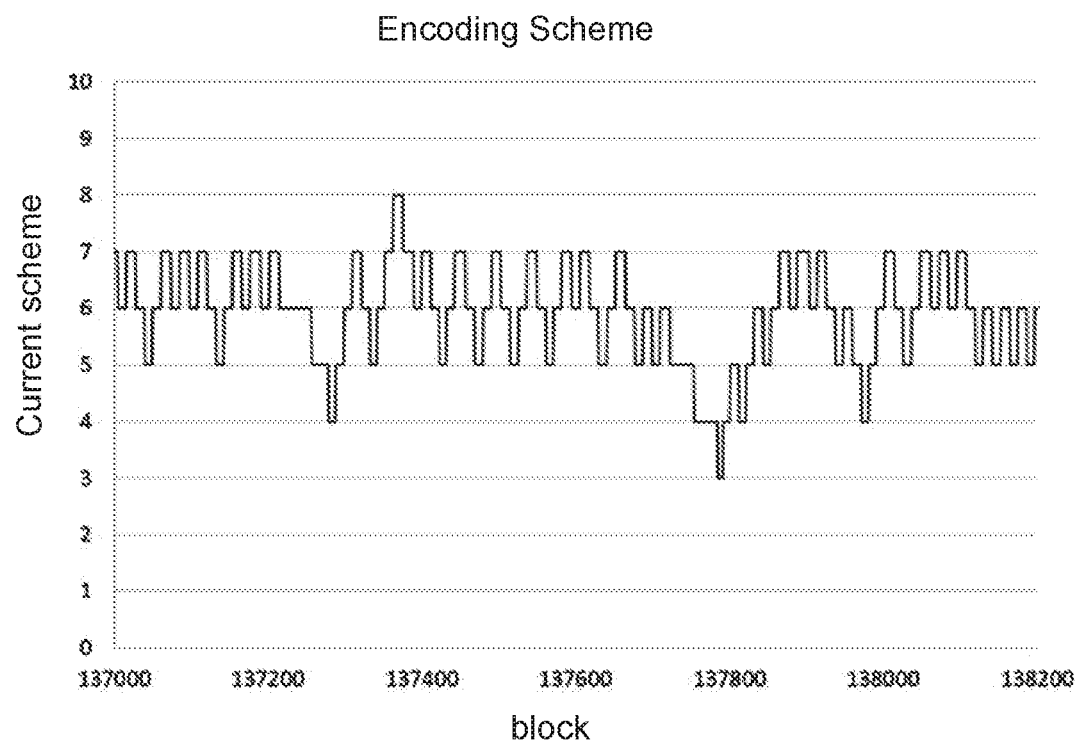
Figure 12H:
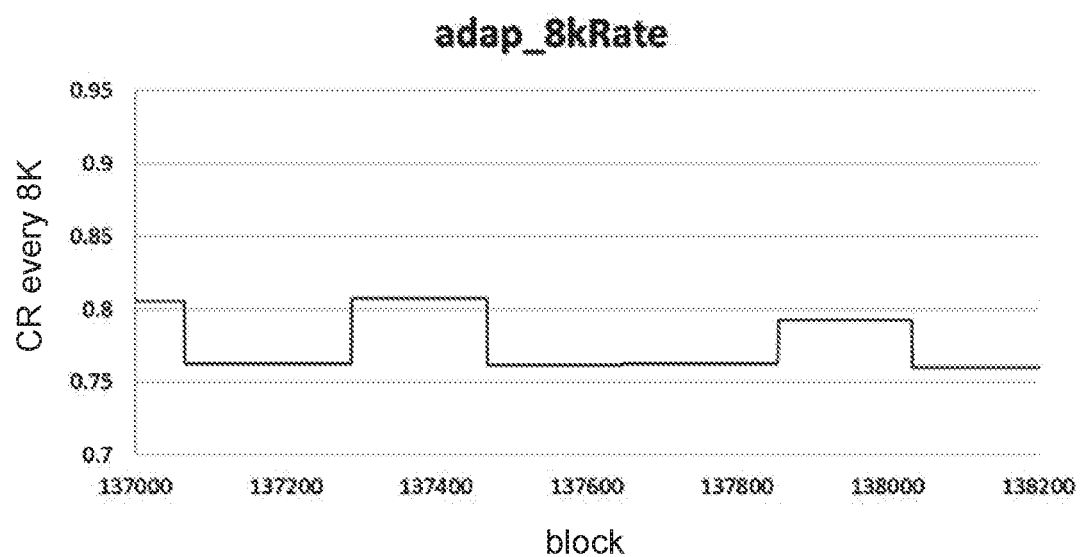

In FIG. 12B an overall compression ratio is shown as the image is progressively compressed for successive blocks throughout the entire image. In this regard, it is noticeable that initially the compression ratio is about 0.76 with the compression ratio gradually increasing and averaging out at approximately 0.805 as compression across the image progresses. Changes in the bit encoding scheme used are shown in FIG. 12C, with the resulting level of compression for each pixel block being shown in FIG. 12D.

This demonstrates shows how the bit encoding scheme changes as blocks are compressed, and highlights that bit encoding schemes 1 to 4 are preferentially used to encode the sky region of the image, whilst the compression for each pixel block remains constrained to a band of between 0.75 and 0.9.

Compression of the bands 1201, 1202 are shown in FIGS. 12E and 12F, and 12G and 12H respectively. In particular, this shows that the sky is preferentially compressed using bit encoding schemes 1 to 4 whilst the rocks are typically compressed using compression schemes 4 to 7.

In this particular example, bit encoding schemes 1 to 4 generally use less scaling, with compression being achieved by discarding frequency components if needed. The reason for this is that the sky region tends to be of a relatively constant colour and saturation meaning the frequency coefficient matrix is formed from frequency coefficients having a generally small value, but with values relatively constant across the entire matrix. Accordingly minimal scaling alone is sufficient to provide the necessary compression without requiring that frequency coefficients are omitted.

In contrast, in compressing the rock features in band 1202, there is a lot of variation in the image content, meaning there are high magnitude frequency coefficients such that scaling needs to be more aggressive.

By reducing scaling of regions where there is minimal change in colour across blocks, this significantly reduces banding artefacts that are obtained using more traditional compression techniques. Nevertheless, by dynamically adjusting the bit encoding scheme used, the system is able to maintain an overall desired degree of compression, whilst allowing different types of content to be compression in the most appropriate manner, thereby avoiding compression artefacts, and hence maintaining image quality.

Throughout all of the above examples, the first coefficient in the coefficient matrix, which is typically referred to as the DC coefficient, can be excluded from this process, allowing the DC coefficient to be transmitted as an eight, ten or twelve bit number, depending on the preferred implementation.

Accordingly the above described arrangement provides an efficient DCT dynamic bit encoding and indexing scheme, which is particularly suited for applications such as streaming high quality video free of banding, for example for use in digital reality applications, such as virtual reality and augmented/mixed reality applications.

Traditional DCT compression, such as JPEG compression, operates by retaining lower frequency coefficients in the frequency coefficient matrix, discarding higher frequency coefficients at a particular level, irrespective of the magnitude of those frequency coefficients. Further compression can be achieved by scaling coefficients at the expense of a reduction in precision. Such approaches tend to be sub-optimal in digital reality applications, in which images are dynamic with much varying content. In particular, such compression approaches tend to result in banding issues.

Accordingly, the above described approach avoids this by seeking to maintain the precision of the DCT coefficients specifically by retaining larger values in the DCT matrix, which play a more important role in the quality of the final image and optionally seeks to provide further improvements by minimising the loss of precision caused by colour space conversion (for example from RGB to YCbCr and back to RGB).

In this regard, as it is not possible to know in advance the location of the larger magnitude coefficients, the largest magnitude coefficients are identified, with an index being generated to identify the location of these coefficients in the matrix. The index can be transferred as part of the compressed image data, and used to reconstruct the matrix during decompression, avoiding the loss of larger magnitude components. This is in contrast to traditional approaches that have focused on retaining lower frequency coefficients and discarding higher frequency coefficients, which can in turn result in loss of higher magnitude frequency coefficients.

Particularly in the context of banding, the above described approach avoids the loss of higher magnitude coefficients, reducing the banding effects, with further improvements being achieved by avoiding the loss of precision from a colour conversion step. Whilst avoiding a colour conversion step is optional it is presented for completeness, and generally its inclusion will depend on the particular implementation and whether colour conversion is mandatory or not. For example, many image processing systems have an RGB<->YCbCr conversion process so the colour conversion step may be required. Additionally the conversion to alternate colour spaces can aid in compression, allowing chrominance channels to be compressed more than the luminance channel, so if further compression is required, that can be beneficial. However, converting to the alternate colour space can result in a loss in precision depending on the representation of the converted pixels (eg: if converted 8 bit to 8 bit integers) and can result in some visible banding for the user and so colour space conversion is typically not preferred.

In order to retain the larger magnitude frequency coefficients, the system adopts a prioritisation and indexing framework where the most important coefficients are sent through first followed by less and less important coefficients, with the number of coefficients transmitted being controlled based on factors, such as the required degree of compression, available bandwidth, or the like. This approach therefore allows the number of bits per pixel array to be increased or decreased depending on the application and the result is the most important values being sent through for the least number of bits. This has important benefits for different application examples described in this document.

The approach typically involves starting with highest bit valued numbers (for example 8 bit numbers), searching for these values in the coefficient matrix starting from level 1 through the entire table, typically following a zig zag pattern. For each frequency coefficient the number is encoded and indexing bits created to denote the location of the frequency coefficient. As part of this process, as each identified frequency component has a defined number of bits, a significant bit can be removed to save bits, for example encoding 8 bit numbers as 7 bits including the sign. After all highest bit numbers are encoded, this process can be repeated for lower bit value numbers in turn, ie: 7, 6, 5, 4, 3, 2, encoding all numbers in the table without losing any precision.

The below lists pseudo code for one possible implementation.

```
Loop (Repeat for each bit numbers 8 down to 2 bit); 7 loops:
N = 8 downto 2
    a.   Find numbers +/−  < (2^N) and >= (2^(N−1))    (find all
         N bit numbers in DCT matrix) in coefficients 2-64 (all
         levels)
      i.    For this perform a comparison on the vector and set
            a resulting vector to 0 or 1 depending on whether
            the value exists or not (Valid table vector)
      ii.   As above the AC coefficients are +/− so checks are
            performed without the sign bit and then include
            that bit in the representation
      iii.  May be useful to store signed bit as a separate
            vector
    b.   Get number of values (represented as M−1) [6 bits]
      i.    If no values found append [0] (1 bit) to output and
            move to next loop iteration
    c.   Generate an index (0-63) [6 bits] define position in
         vector according to following order of coefficients:
      i.    Perform zig-zag traversal to list the coefficients
            in vector form thereby creating a table used for
            lookup that can support indexing of all signed
            numbers
      ii.   Take the vector and starting at the SECOND value
            (first AC coefficient) and create a 63 value long
            number (int 16 type)
    d.   Data:
      i.    Store data as (VALUE−1)      [size N−2 bits]
      ii.   Note: data is removed from top (1st) bit as it always
            has the top bit set
      iii.  Note: for 2 bit numbers there is no data bit sent,
            only the sign bit which can then create +/− 1 value
            on the decode side
    e.   Packetize data
      i.    [1 (data found)]  [num values − 1 (6 bits)]  [first
            index (6 bits)]  [first sign bit (1 bit)]  [first
            data (N−2 bits − 6, 5, 4, 3, 2, 1 bits)]  ...  [last
            valid index (6 bits)]  [last sign bit (1 bit)]
            [last data (N−2 bits − 6,5,4,3, 2, 1)]
    f.   Repeat for number bit values 8 down to 2
```

After encoding the most significant frequency components can be transmitted, whilst varying numbers of less significant frequency components can be discarded to obtain a significant degree of compression. It will be appreciated that this allows the number of frequency components transmitted to be adjusted depending on the compression ratio to be achieved.

It will also be appreciated that a variety of methods can be used for the above and for subsequent packetization of the bits being sent through the communications medium.

In particular, the above allows for either fixed or dynamic bit encoding schemes to be implemented. The fixed case uses pre-defined rules to provide an output of the number of bits to send per pixel array, with bits outside this range being discarded. An example of this involves retaining a fixed number of bits per pixel array based on the distance of the pixel array away from a user's eye position. This can be used to provide foveated compression.

In contrast dynamic encoding uses information about the bit encoding process, with each pixel array being represented by how many bits are needed to fully represent the pixel array, for example depending on the complexity of the pixel array content. In this instance, each pixel array can be dynamically encoded so that more complex pixel arrays are given more bit allocation than other pixel arrays.

Accordingly, the above described example encodes different pixel arrays within an image with different bit encoding schemes to thereby change compression throughout a frame, thereby allowing a respective target compression to be obtained. However, it will be appreciated that this is not essential and other techniques could be used to achieve target compression.

For example, compression could be varied between frames. In this example, this could be achieved by using a respective compression scheme, respective bit encoding scheme, or respective compression/encoding parameters across an entire frame, with the compression/encoding scheme/parameters being varied between frames, thereby allowing a target compression to be obtained.

In another example, a frame rate could be altered to achieve an overall target bandwidth. For example, reducing a frame rate can be used to reduce an amount of data that needs compressing, thereby allowing reduced degree of compression to be used to meet a target bandwidth requirement, and/or allowing a reduced target bandwidth to be met using the same degree of compression. Thus, it will be appreciated that this could be used in limited bandwidth situations, reducing frame rate to meet a target bandwidth, whilst allowing this to be achieved without unduly effecting resulting image quality. In this example, the processing device can be configured to select a target frame rate in accordance with at least one of a target compression and target bandwidth and cause content to be at least one of generated and compressed in accordance with the frame rate.

Accordingly, the above described system operates by analysing network and user metrics in order to determine a target bandwidth for each of a plurality of users. This information is used to calculate a target compression, with a dynamic compression algorithm being used to dynamically compress an image to thereby meet the required target compression.

Thus, the above described system can provide a method that reacts to changing network conditions for each user and sets a target bandwidth and hence compression for each user to maintain a quality for every user, whilst ensuring the network is not overloaded.

In one example, the compression methods can react to specific instantaneous event conditions for mixed reality device users, for example to alter compression instantaneously based on display device movement.

In one example, this is achieved using multiple instances of encoders/decoders associated with a content delivery solution, thereby allow digital reality content, such as VR, AR and mixed reality, to be generated remotely and provided over communications networks, whilst minimising latency.

In one example, the system implements a controller that drives a target bandwidth based on network capabilities for each user. The system can be implemented using various network architectures, including using a single server solution to support low latency networks connected to multiple Access Points (APs)/antennas (nodes) with multiple users at each AP.

The controller can be configured to be aware of the various nodes, the number and types of users on each, allocating bandwidth to each user taking into account metrics such as user priorities (telco provided), a network quality of service to each node, or a user quality of service on each AP, or the like.

The controller can control bandwidth allocation based on a display device type, which defines VR/AR/PC specific compression algorithms to be employed for that user, resolutions, frame rates, compression techniques, etc., as well as based on specific content.

The system determine instantaneous movement of the user at any one time, with this information being fed back to the controller to adjust compression ratios, for example by increasing compression for users with higher rotational and translational movements. Different compression techniques can be used to achieve different compression for different movement states of the user. Thus, if the user isn't moving a lot, a frame rate may drop to preserve detail, whereas if the display device is moving rapidly, frame rate might be preserved, but with an increased compression.

Target bandwidth and compression can be changed instantaneously at every packet sent out from the system, with a variety of compression techniques, such as dynamic foveation, adaptive control, masking, eye differencing, frame rate control, or the like, being used to meet the target compression requirements.

The system can be configured to supports different user level types, for example, to provide different experience/quality to different types of users. Similarly the system can support different levels of quality for different device types. For example more compressions/different quality for AR glasses compared to a high end VR HMD.

Accordingly, in one example, the above described arrangements can provide advanced bandwidth control for multiple users on networks, such as 5G. In one example, the system can maintain a quality for each user by using available information in the VR/MR system and instructing the individual encoders for each player the target average bandwidth. Different users can be assigned different priorities, with bandwidth and/or compression being adjusted accordingly. In one example, this allows the system to attempt to provide each type of user with a similar level of visual quality given available network bandwidth.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A system for controlling content compression for transmission via a communications network used to serve content to a plurality of users, the system including one or more processing devices configured to:
   a) acquire one or more network metrics indicative of communications network performance;
   b) acquire one or more user metrics for each of the plurality of users, the one or more user metrics being indicative of content display requirements associated with each user;
   c) dynamically calculate a target compression for each of the plurality of users at least in part based on at least one of the network metrics and the user metrics; and,
   d) cause content for each user to be compressed in accordance with the target compression for that user, wherein the one or more processing devices include:
      i) a network controller configured to calculate at least one of a target bandwidth and target quality for each user; and,
      ii) a plurality of encoders, each encoder being associated with a content engine generating content for a respective user, wherein the encoders are configured to calculate the target compression for the respective user and wherein each encoder is configured to:
         (1) receive display device status metrics;

(2) pass the display device status metrics to the content engine to allow the content engine to generate the content;
(3) calculate the target compression using at least the display device status metrics and at least one of the target bandwidth and a target quality;
(4) receive the content from the content engine; and,
(5) encode the content in accordance with the target compression.

2. A system according to claim 1, wherein the one or more processing devices are configured to calculate the target compression at least in part based on an available network bandwidth for transferring content to all of the users.

3. A system according to claim 1, wherein the one or more processing devices are configured to:
   a) determine an available network bandwidth using at least one network metric; and,
   b) calculate a target bandwidth for each of the plurality of users using at least one user metric.

4. A system according to claim 3, wherein the one or more processing devices are configured to calculate the target compression for each user using the target bandwidth and at least one of:
   a) user metrics;
   b) a target quality; and,
   c) a content size.

5. A system according to claim 3, wherein the network includes a plurality of nodes, and wherein the one or more processing devices are configured to dynamically calculate a target compression for each of the plurality of users on each node.

6. A system according to claim 1, wherein the network metrics at least one of:
   a) include any one or more of:
      i) current network loads;
      ii) a network bandwidth;
      iii) a network latency;
      iv) at least one network error metric;
      v) a user quality of service; and,
      vi) a network quality of service;
   b) are defined for different parts of a network, and wherein the one or more processing devices are configured to determine a target compression at least one of:
      i) for each part of the network;
      ii) for each user;
      iii) for each user on each part of the network; and,
      iv) for each part of the network independently.

7. A system according to claim 1, wherein the content is displayed using a display device, and wherein the user metrics include any one or more of:
   a) user configuration metrics indicative of:
      i) a user type;
      ii) a user priority; and,
      iii) a user target quality;
   b) content metrics indicative of:
      i) a content type;
      ii) a content of different parts of an image;
      iii) an opacity of different parts of an image;
      iv) areas of interest within an image;
      v) locations of interest within an image;
      vi) one or more cues associated with an image; and,
      vii) one or more display objects within an image;
   c) display device configuration metrics indicative of at least one of:
      i) a display device type;
      ii) a display device frame rate;
      iii) a display device resolution;
      iv) a display device field of view; and,
      v) display device lens attributes; and,
   d) display device status metrics indicative of at least one of:
      i) a display device pose relative to the environment;
      ii) a display device movement relative to the environment;
      iii) a display device acceleration relative to the environment;
      iv) input commands provided by a user;
      v) a user gaze; and,
      vi) a physiological attribute of the user.

8. A system according to claim 1, wherein the one or more processing devices are configured to at least one of:
   a) calculate at least one of the target bandwidth and a target quality for each of the plurality of users using at least one of:
      i) network metrics;
      ii) user configuration metrics;
      iii) content metrics;
      iv) display device configuration metrics; and,
      v) display device status metrics;
   b) calculate the target compression using one or more of:
      i) a target bandwidth;
      ii) a target quality; and,
      iii) display metrics; and,
   c) determine the user metrics from at least one of:
      i) a service provider providing user configuration metrics;
      ii) a user providing user configuration metrics;
      iii) a display device providing at least one of:
         (1) display device configuration metrics; and,
         (2) display metrics; and,
      iv) a content engine configured to generate content for the user, the content engine providing content metrics.

9. A system according to claim 1, wherein the one or more processing devices are configured to at least one of:
   a) calculate a target bandwidth at least one of:
      i) substantially in real time;
      ii) every second;
      iii) every image;
      iv) every 11 ms;
      v) hundreds of times a second; and,
      vi) hundreds of times per image;
   b) calculate the current target compression at least one of:
      i) substantially in real time;
      ii) for each of a plurality of images within the content;
      iii) for each of multiple different parts of each of a plurality of images within the content;
      iv) for multiple different pixel arrays within each of a plurality of images within the content; and,
      v) hundreds of times per image;
   c) select a target frame rate in accordance with at least one of a target compression and target bandwidth and cause content to be at least one of generated and compressed in accordance with the frame rate,
   d) select a compression scheme in accordance with the target compression and compress the content using the selected compression scheme.

10. A system for controlling content compression for transmission via a communications network used to serve content to a plurality of users, the system including one or more processing devices configured to:
   a) acquire one or more network metrics indicative of communications network performance;

b) acquire one or more user metrics for each of the plurality of users, the one or more user metrics being indicative of content display requirements associated with each user;

c) dynamically calculate a target compression for each of the plurality of users at least in part based on at least one of the network metrics and the user metrics; and, d) cause content for each user to be compressed in accordance with the target compression for that user, wherein the one or more processing devices are configured to perform compression of images within the content by:

obtaining pixel data from image data, the pixel data representing a pixel array within the one or more images;

ii) applying a transformation to the pixel data to determine a set of frequency coefficients indicative of frequency coefficients of the pixel array;

iii) encoding a selected subset of the set of frequency coefficients, the subset being selected to preferentially encode frequency coefficients having a higher magnitude;

iv) generating an index indicative of the encoded frequency coefficients; and, v) generating compressed image data using the encoded frequency coefficients and the index.

11. A system according to claim 10, wherein the one or more processing devices are configured to at least one of:

a) select the subset of the set of frequency coefficients by selecting frequency coefficients having progressively smaller numbers of bits;

b) select the subset of the set of frequency coefficients based on at least one of:
  i) the target compression;
  ii) content metrics;
  iii) display device configuration metrics; and,
  iv) display device status metrics; and, c) select the subset of the set of frequency coefficients so that:
  i) different parts of the image are compressed using a different degree of compression; and,
  ii) the target compression is maintained across one or more images.

12. A system according to claim 10, wherein the one or more processing devices are configured to:

a) determine the target compression;

b) select a bit encoding scheme at least in part in accordance with the target compression; and, c) encode the set of frequency coefficients in accordance with the bit encoding scheme and wherein the index is indicative of the selected bit encoding scheme.

13. A system according to claim 12, wherein the one or more processing devices are configured to:

a) encode a number of pixel arrays using the selected bit encoding scheme; and, b) select a next bit encoding scheme based on compression of the number of pixel arrays.

14. A system according to claim 12, wherein the one or more processing devices are configured to select the bit encoding scheme using at least one of:

a) a cumulative bit total for a number of previous pixel arrays;

b) a target bit rate based on the target compression;

c) a position of the pixel array within the one or more images;

d) the target compression;

e) content metrics;

f) display device configuration metrics; and, g) display device status metrics.

15. A system according to claim 12, wherein the one or more processing devices are configured to:

a) determine a cumulative bit total for a number of previous pixel arrays; and, b) if the cumulative bit total exceeds a cumulative bit total threshold:
  i) determine a degree of compression for the number of previous pixel arrays; and,
  ii) select the bit encoding scheme using the degree of compression and the target degree of compression.

16. A system according to claim 10, wherein the one or more processing devices are configured to:

a) select one of a number of bit encoding schemes, wherein each bit encoding scheme defines:
  i) available scaling factors; and,
  ii) a bit threshold, wherein frequency coefficients are selectively encoded in accordance with the bit threshold;

b) scale frequency coefficients using an available scaling factor that is at least a minimum scaling factor; and, c) encode scaled frequency coefficients in accordance with the bit threshold by at least one of:
  i) encoding scaled frequency coefficients having more bits than the bit threshold; and,
  ii) discarding scaled frequency coefficients having less bits that the bit threshold.

17. A method for controlling content compression for transmission via a communications network used to serve content to a plurality of users, the method including, in one or more processing devices:

a) acquiring one or more network metrics indicative of communications network performance;

b) acquiring one or more user metrics for each of the plurality of users, the one or more user metrics being indicative of content display requirements associated with each user;

c) dynamically calculating a target compression for each of the plurality of users at least in part based on the network metrics and the user metrics; and, d) causing content for each user to be compressed in accordance with the target compression for that user, wherein the one or more processing devices include:
  i) a network controller configured to calculate at least one of a target bandwidth and target quality for each user; and,
  ii) a plurality of encoders, each encoder being associated with a content engine generating content for a respective user, wherein the encoders are configured to calculate the target compression for the respective user and wherein each encoder is configured to:
    (1) receive display device status metrics;
    (2) pass the display device status metrics to the content engine to allow the content engine to generate the content;
    (3) calculate the target compression using at least the display device status metrics and at least one of the target bandwidth and a target quality;
    (4) receive the content from the content engine; and,
    (5) encode the content in accordance with the target compression.

18. A non-transitory computer-readable storage medium storing instructions for controlling content compression for transmission via a communications network used to serve content to a plurality of users, when the instructions are executed on one or more suitably programmed processing devices causes the one or more processing devices to:
a) acquire one or more network metrics indicative of communications network performance;
b) acquire one or more user metrics for each of the plurality of users, the one or more user metrics being indicative of content display requirements associated with each user;
c) dynamically calculate a target compression for each of the plurality of users at least in part based on the network metrics and the user metrics; and,
d) cause content for each user to be compressed in accordance with the target compression for that user, wherein the one or more processing devices include:
   i) a network controller configured to calculate at least one of a target bandwidth and target quality for each user; and,
   ii) a plurality of encoders, each encoder being associated with a content engine generating content for a respective user, wherein the encoders are configured to calculate the target compression for the respective user and wherein each encoder is configured to:
      (1) receive display device status metrics;
      (2) pass the display device status metrics to the content engine to allow the content engine to generate the content;
      (3) calculate the target compression using at least the display device status metrics and at least one of the target bandwidth and a target quality;
      (4) receive the content from the content engine; and,
      (5) encode the content in accordance with the target compression.

19. A method for controlling content compression for transmission via a communications network used to serve content to a plurality of users, the method including in one or more processing devices:
a) acquiring one or more network metrics indicative of communications network performance;
b) acquiring one or more user metrics for each of the plurality of users, the one or more user metrics being indicative of content display requirements associated with each user;
c) dynamically calculating a target compression for each of the plurality of users at least in part based on at least one of the network metrics and the user metrics; and,
d) causing content for each user to be compressed in accordance with the target compression for that user, wherein the method includes in the one or more processing devices, performing compression of images within the content by:
   i) obtaining pixel data from image data, the pixel data representing a pixel array within the one or more images;
   ii) applying a transformation to the pixel data to determine a set of frequency coefficients indicative of frequency coefficients of the pixel array;
   iii) encoding a selected subset of the set of frequency coefficients, the subset being selected to preferentially encode frequency coefficients having a higher magnitude;
   iv) generating an index indicative of the encoded frequency coefficients; and,
   v) generating compressed image data using the encoded frequency coefficients and the index.

20. A non-transitory computer-readable storage medium storing instructions for controlling content compression for transmission via a communications network used to serve content to a plurality of users, which when the instructions are executed on one or more suitably programmed processing devices causes the one or more processing devices to:
a) acquire one or more network metrics indicative of communications network performance;
b) acquire one or more user metrics for each of the plurality of users, the one or more user metrics being indicative of content display requirements associated with each user;
c) dynamically calculate a target compression for each of the plurality of users at least in part based on at least one of the network metrics and the user metrics; and,
d) cause content for each user to be compressed in accordance with the target compression for that user, wherein the one or more processing devices are configured to perform compression of images within the content by:
   i) obtaining pixel data from image data, the pixel data representing a pixel array within the one or more images;
   ii) applying a transformation to the pixel data to determine a set of frequency coefficients indicative of frequency coefficients of the pixel array;
   iii) encoding a selected subset of the set of frequency coefficients, the subset being selected to preferentially encode frequency coefficients having a higher magnitude;
   iv) generating an index indicative of the encoded frequency coefficients; and,
   v) generating compressed image data using the encoded frequency coefficients and the index.

* * * * *